United States Patent
Barber et al.

(12)

(10) Patent No.: US 11,619,716 B1
(45) Date of Patent: Apr. 4, 2023

(54) LIGHT DETECTION AND RANGING (LIDAR) SENSOR SYSTEM INCLUDING SEED MODULATION MODULE

(71) Applicant: Aurora Operations, Inc., Mountain View, CA (US)

(72) Inventors: Zeb Barber, Bozeman, MT (US); Randy Ray Reibel, Bozeman, MT (US); Sean Spillane, Bozeman, MT (US)

(73) Assignee: AURORA OPERATIONS, INC., Mountain View, CA (US)

( * ) Notice: Subject to any disclaimer, the term of this patent is extended or adjusted under 35 U.S.C. 154(b) by 0 days.

(21) Appl. No.: 17/888,364

(22) Filed: Aug. 15, 2022

(51) Int. Cl.
  *G01S 7/484* (2006.01)
  *G01S 7/4861* (2020.01)
  *G01S 17/931* (2020.01)

(52) U.S. Cl.
  CPC ............ *G01S 7/484* (2013.01); *G01S 7/4861* (2013.01); *G01S 17/931* (2020.01)

(58) Field of Classification Search
  CPC ........ G01S 7/4818; G01S 7/484; G01S 7/486; G01S 7/4861; G01S 17/32; G01S 17/931; G02F 2203/70; H04B 10/2914
  See application file for complete search history.

(56) References Cited

U.S. PATENT DOCUMENTS

| 6,597,836 | B2 * | 7/2003 | Johnson | G02B 27/144 385/33 |
| 6,708,003 | B1 * | 3/2004 | Wickham | H04B 10/1121 398/161 |
| 7,502,395 | B2 * | 3/2009 | Cheng | H01S 3/2383 356/477 |
| 11,467,263 | B1 * | 10/2022 | Greene | G01S 7/484 |
| 2022/0128666 | A1 * | 4/2022 | Schrans | G02F 1/292 |
| 2022/0334232 | A1 * | 10/2022 | Behzadi | G01S 7/4816 |

FOREIGN PATENT DOCUMENTS

| CN | 112130337 A | * 12/2020 | ............. G02B 27/10 |
| EP | 3026455 A1 | * 6/2016 | ........... G01S 7/4814 |

* cited by examiner

*Primary Examiner* — Yuqing Xiao
*Assistant Examiner* — Benjamin Richard Hebert
(74) *Attorney, Agent, or Firm* — Foley & Lardner LLP

(57) ABSTRACT

A device may include an input optical path, a first optical path, a plurality of second optical paths, a first optical amplifier, a plurality of second optical amplifiers, and a control circuit. The input optical path may receive, at one end thereof, a beam from a laser source. The first optical path and the second optical paths may be respectively branched from at the other end of the input optical path. The first optical amplifier may be coupled to the first optical path. The second optical amplifiers may be respectively coupled to the second optical paths. The control circuit may selectively turn on one of the second optical amplifiers to output a modulated optical signal of the beam. The control circuit may turn on the first optical amplifier, in synchronization with turning on any one of the second optical amplifiers, to output a local oscillator (LO) signal.

20 Claims, 12 Drawing Sheets

LIGHT DETECTION AND RANGING (LIDAR) SENSOR SYSTEM INCLUDING SEED MODULATION MODULE

BACKGROUND

Light detection and ranging (lidar) sensor systems are used for a variety of applications, from altimetry, to imaging, to collision avoidance. Lidar provides finer scale range resolution with smaller beam sizes than conventional microwave ranging systems, such as radio-wave detection and ranging (radar). Optical detection of range can be accomplished with several different techniques, including direct ranging based on round trip travel time of an optical pulse to an object, and chirped detection based on a frequency difference between a transmitted chirped optical signal and a returned signal scattered from an object, and phase-encoded detection based on a sequence of single frequency phase changes that are distinguishable from natural signals.

In applying these techniques, a lidar sensor system may include a modulator configured to receive an optical signal from a laser source and modulate the optical signal prior to transmitting the optical signal to an environment. The lidar sensor system may also use time separated I/Q processing (aka time domain multiplexing) to overcome hardware requirements. For example, multiple transmit (TX) channels may be temporally multiplexed to share limited hardware resources (e.g., receive (RX)-side hardware resources). There is a need for a mechanism to efficiently perform modulation and multiplexing with limited hardware resources.

SUMMARY

Implementations of the present disclosure relate to a system and a method for a light detection and ranging (lidar) sensor system, and more particularly to a system and a method for a lidar sensor system including a seed modulation module.

In some implementations of the present disclosure, a device may include an input optical path, a first optical path, a plurality of second optical paths, a first optical amplifier, a plurality of second optical amplifiers, and a control circuit. The input optical path may be configured to receive, at one end thereof, a beam from a laser source. The first optical path and a plurality of second optical paths may be respectively branched from at the other end of the input optical path. The first optical amplifier may be coupled to the first optical path. The plurality of second optical amplifiers may be respectively coupled to the plurality of second optical paths. The control circuit may be configured to selectively turn on one of the plurality of second optical amplifiers to output a modulated optical signal of the beam. The control circuit may be configured to turn on the first optical amplifier, in synchronization with turning on any one of the plurality of second optical amplifiers, to output a local oscillator (LO) signal.

In some implementations of the present disclosure, autonomous vehicle control system may include one or more processors and one or more computer-readable storage mediums. The mediums may store instructions which, when executed by the one or more processors, cause the one or more processors to generate, based on a beam generated from a laser source, an optical signal that is frequency-shifted by a frequency offset relative to a local oscillator (LO) signal. The one or more processors may be configured to transmit the optical signal to an environment. In response to transmitting the optical signal, the one or more processors may be configured to receive a returned optical signal that is reflected from an object in the environment. The one or more processors may be configured to generate a digital signal based on the received signal. The one or more processors may be configured to digitally mix the digital signal based on the frequency offset to generate a sample signal. The one or more processors may be configured to determine, based on the sample signal, a range to the object. The one or more processors may be configured to control operation of a vehicle using the range to the object.

In some implementations of the present disclosure, a light detection and ranging (lidar) system may include the device, a laser source configured to generate a beam, a plurality of transmit (TX) channels, and one or more optical components. The one or more optical components may be configured to receive, from the device, a first modulated optical signal and a first LO signal that is associated with the first modulated optical signal. The one or more optical components may be configured to receive, from the device, a second modulated optical signal and a second LO signal that is associated with the second modulated optical signal. The one or more optical components may be configured to transmit the first and second modulated optical signals at first and second TX channels, among the plurality of TX channels, respectively, to an environment. The one or more optical components may be configured to receive first and second returned optical signals that are reflected from one or more objects in the environment. The one or more optical components may be configured to pair the first and second returned optical signals with the first and second LO signals, respectively.

In some implementations of the present disclosure, a method of generating modulated optical signals in circuitry may include receiving, by the circuitry from a laser source, a beam at an input optical path of the circuitry. The circuitry may include the input optical path, a first optical path and a plurality of second optical paths, respectively branched from the input optical path, a first optical amplifier coupled to the first optical path, and a plurality of second optical amplifiers respectively coupled to the plurality of second optical paths. The method may include receiving, by the circuitry from a laser source, a beam at the input optical path. The method may include selectively turning on, by the circuitry, one of the plurality of second optical amplifiers to output a modulated optical signal of the beam. The method may include turning on, by the circuitry, the first optical amplifier, in synchronization with turning on any one of the plurality of second optical amplifiers, to output a local oscillator (LO) signal.

BRIEF DESCRIPTION OF THE DRAWINGS

The patent or application file contains at least one drawing executed in color. Copies of this patent application publication with color drawing(s) will be provided by the Office upon request and payment of the necessary fee.

These and other aspects and features of the present implementations will become apparent to those ordinarily skilled in the art upon review of the following description of specific implementations in conjunction with the accompanying figures, wherein.

DETAILED DESCRIPTION

According to certain aspects, implementations in the present disclosure relate to a system and a method for controlling a vehicle using light detection and ranging (lidar), and more particularly to a system and a method for a lidar sensor system including a seed modulation module.

According to certain aspects, a device may include an input optical path, a first optical path, a plurality of second optical paths, a first optical amplifier, a plurality of second optical amplifiers, and a control circuit. The input optical path may be configured to receive, at one end thereof, a beam from a laser source. The first optical path and a plurality of second optical paths may be respectively branched from at the other end of the input optical path. The first optical amplifier may be coupled to the first optical path. The plurality of second optical amplifiers may be respectively coupled to the plurality of second optical paths. The control circuit may be configured to selectively turn on one of the plurality of second optical amplifiers to output a modulated optical signal of the beam. The control circuit may be configured to turn on the first optical amplifier, in synchronization with turning on any one of the plurality of second optical amplifiers, to output a local oscillator (LO) signal.

1. System Environment for Autonomous Vehicles

Figure 1A:
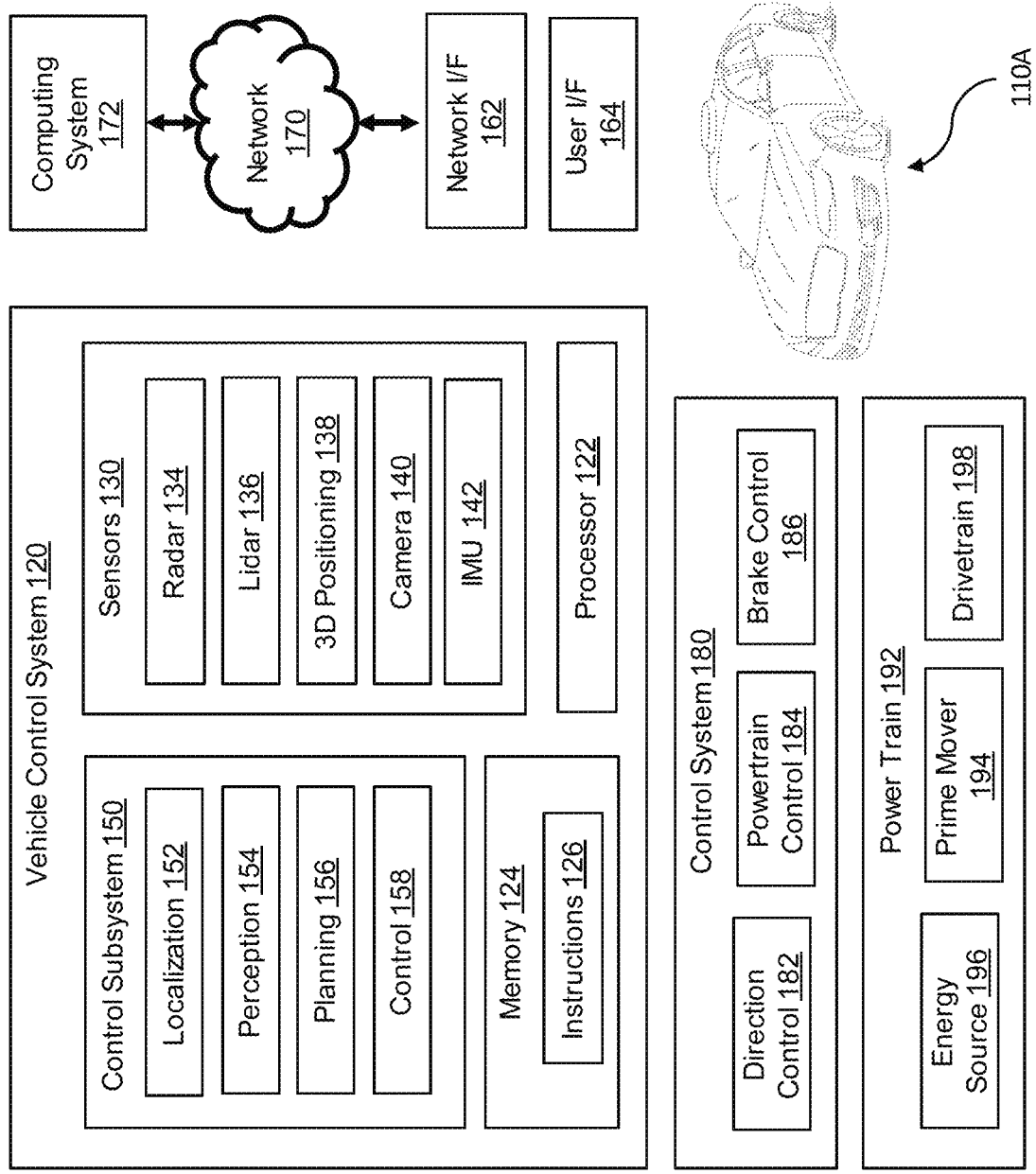
FIG. 1A is a block diagram illustrating an example of a system environment for autonomous vehicles according to some implementations.

FIG. 1A is a block diagram illustrating an example of a system environment for autonomous vehicles according to some implementations.

Referring to FIG. 1A, an example autonomous vehicle 110A within which the various techniques disclosed herein may be implemented. The vehicle 110A, for example, may include a powertrain 192 including a prime mover 194 powered by an energy source 196 and capable of providing power to a drivetrain 198, as well as a control system 180 including a direction control 182, a powertrain control 184, and a brake control 186. The vehicle 110A may be implemented as any number of different types of vehicles, including vehicles capable of transporting people and/or cargo, and capable of traveling in various environments, and it will be appreciated that the aforementioned components 180-198 can vary widely based upon the type of vehicle within which these components are utilized.

For simplicity, the implementations discussed hereinafter will focus on a wheeled land vehicle such as a car, van, truck, bus, etc. In such implementations, the prime mover 194 may include one or more electric motors and/or an internal combustion engine (among others). The energy source may include, for example, a fuel system (e.g., providing gasoline, diesel, hydrogen, etc.), a battery system, solar panels or other renewable energy source, and/or a fuel cell system. The drivetrain 198 can include wheels and/or tires along with a transmission and/or any other mechanical drive components to convert the output of the prime mover 194 into vehicular motion, as well as one or more brakes configured to controllably stop or slow the vehicle 110A and direction or steering components suitable for controlling the trajectory of the vehicle 110A (e.g., a rack and pinion steering linkage enabling one or more wheels of the vehicle 110A to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles), and in some instances multiple electric motors (e.g., dedicated to individual wheels or axles) may be used as a prime mover.

The direction control 182 may include one or more actuators and/or sensors for controlling and receiving feedback from the direction or steering components to enable the vehicle 110A to follow a desired trajectory. The powertrain control 184 may be configured to control the output of the powertrain 102, e.g., to control the output power of the prime mover 194, to control a gear of a transmission in the drivetrain 198, etc., thereby controlling a speed and/or direction of the vehicle 110A. The brake control 116 may be configured to control one or more brakes that slow or stop vehicle 110A, e.g., disk or drum brakes coupled to the wheels of the vehicle.

Other vehicle types, including but not limited to off-road vehicles, all-terrain or tracked vehicles, construction equipment etc., will necessarily utilize different powertrains, drivetrains, energy sources, direction controls, powertrain controls and brake controls. Moreover, in some implementations, some of the components can be combined, e.g., where directional control of a vehicle is primarily handled by varying an output of one or more prime movers. Therefore, implementations disclosed herein are not limited to the particular application of the herein-described techniques in an autonomous wheeled land vehicle.

Various levels of autonomous control over the vehicle 110A can be implemented in a vehicle control system 120, which may include one or more processors 122 and one or more memories 124, with each processor 122 configured to execute program code instructions 126 stored in a memory 124. The processors(s) can include, for example, graphics processing unit(s) ("GPU(s)") and/or central processing unit(s) ("CPU(s)").

Sensors 130 may include various sensors suitable for collecting information from a vehicle's surrounding environment for use in controlling the operation of the vehicle. For example, sensors 130 can include radar sensor 134, lidar (Light Detection and Ranging) sensor 136, a 3D positioning sensors 138, e.g., any of an accelerometer, a gyroscope, a magnetometer, or a satellite navigation system such as GPS (Global Positioning System), GLONASS (Globalnaya Navigazionnaya Sputnikovaya Sistema, or Global Navigation Satellite System), BeiDou Navigation Satellite System (BDS), Galileo, Compass, etc. The 3D positioning sensors 138 can be used to determine the location of the vehicle on the Earth using satellite signals. The sensors 130 can include a camera 140 and/or an IMU (inertial measurement unit) 142. The camera 140 can be a monographic or stereographic camera and can record still and/or video images. The IMU 142 can include multiple gyroscopes and accelerometers capable of detecting linear and rotational motion of the vehicle in three directions. One or more encoders (not illustrated), such as wheel encoders may be used to monitor the rotation of one or more wheels of vehicle 110A. Each sensor 130 can output sensor data at various data rates, which may be different than the data rates of other sensors 130.

The outputs of sensors 130 may be provided to a set of control subsystems 150, including, a localization subsystem 152, a planning subsystem 156, a perception subsystem 154, and a control subsystem 158. The localization subsystem 152 can perform functions such as precisely determining the location and orientation (also sometimes referred to as "pose") of the vehicle 110A within its surrounding environment, and generally within some frame of reference. The location of an autonomous vehicle can be compared with the location of an additional vehicle in the same environment as part of generating labeled autonomous vehicle data. The perception subsystem 154 can perform functions such as detecting, tracking, determining, and/or identifying objects within the environment surrounding vehicle 110A. A machine learning model can be utilized in tracking objects. The planning subsystem 156 can perform functions such as planning a trajectory for vehicle 110A over some timeframe given a desired destination as well as the static and moving objects within the environment. A machine learning can be utilized in planning a vehicle trajectory. The control subsystem 158 can perform functions such as generating suitable control signals for controlling the various controls in the vehicle control system 120 in order to implement the planned trajectory of the vehicle 110A. A machine learning model can be utilized to generate one or more signals to control an autonomous vehicle to implement the planned trajectory.

It will be appreciated that the collection of components illustrated in FIG. 1A for the vehicle control system 120 is merely exemplary in nature. Individual sensors may be omitted in some implementations. Additionally or alternatively, in some implementations, multiple sensors of types illustrated in FIG. 1A may be used for redundancy and/or to cover different regions around a vehicle, and other types of sensors may be used. Likewise, different types and/or combinations of control subsystems may be used in other implementations. Further, while subsystems 152-158 are illustrated as being separate from processor 122 and memory 124, it will be appreciated that in some implementations, some or all of the functionality of a subsystem 152-158 may be implemented with program code instructions 126 resident in one or more memories 124 and executed by one or more processors 122, and that these subsystems 152-158 may in some instances be implemented using the same processor(s) and/or memory. Subsystems may be implemented at least in part using various dedicated circuit logic, various processors, various field programmable gate arrays ("FPGA"), various application-specific integrated circuits ("ASIC"), various real time controllers, and the like, as noted above, multiple subsystems may utilize circuitry, processors, sensors, and/or other components. Further, the various components in the vehicle control system 120 may be networked in various manners.

In some implementations, the vehicle 110A may also include a secondary vehicle control system (not illustrated), which may be used as a redundant or backup control system for the vehicle 110A. The secondary vehicle control system may be capable of fully operating the autonomous vehicle 110A in the event of an adverse event in the vehicle control system 120, while in other implementations, the secondary vehicle control system may only have limited functionality, e.g., to perform a controlled stop of the vehicle 110A in response to an adverse event detected in the primary vehicle control system 120. In still other implementations, the secondary vehicle control system may be omitted.

In general, an innumerable number of different architectures, including various combinations of software, hardware, circuit logic, sensors, networks, etc. may be used to implement the various components illustrated in FIG. 1A. Each processor may be implemented, for example, as a microprocessor and each memory may represent the random access memory ("RAM") devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in the vehicle 110A, e.g., any cache memory in a processor, as well as any storage capacity used as a virtual memory, e.g., as stored on a mass storage device or another computer controller. One or more processors illustrated in FIG. 1A, or entirely separate processors, may be used to implement additional functionality in the vehicle 110A outside of the purposes of autonomous control, e.g., to control entertainment systems, to operate doors, lights, convenience features, etc.

In addition, for additional storage, the vehicle 110A may include one or more mass storage devices, e.g., a removable disk drive, a hard disk drive, a direct access storage device ("DASD"), an optical drive (e.g., a CD drive, a DVD drive, etc.), a solid state storage drive ("SSD"), network attached storage, a storage area network, and/or a tape drive, among others.

Furthermore, the vehicle 110A may include a user interface 164 to enable vehicle 110A to receive a number of inputs from and generate outputs for a user or operator, e.g., one or more displays, touchscreens, voice and/or gesture interfaces, buttons and other tactile controls, etc. Otherwise, user input may be received via another computer or electronic device, e.g., via an app on a mobile device or via a web interface.

Moreover, the vehicle 110A may include one or more network interfaces, e.g., network interface 162, suitable for communicating with one or more networks 170 (e.g., a Local Area Network ("LAN"), a wide area network ("WAN"), a wireless network, and/or the Internet, among others) to permit the communication of information with other computers and electronic device, including, for example, a central service, such as a cloud service, from which the vehicle 110A receives environmental and other data for use in autonomous control thereof. Data collected by the one or more sensors 130 can be uploaded to a computing system 172 via the network 170 for additional processing. A time stamp can be added to each instance of vehicle data prior to uploading. Additional processing of autonomous vehicle data by computing system 172 in accordance with many implementations is described with respect to FIG. 2.

Each processor illustrated in FIG. 1A, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer coupled to vehicle 110A via network 170, e.g., in a distributed, cloud-based, or client-server computing environment, whereby the processing required to implement the functions of a computer program may be allocated to multiple computers and/or services over a network.

In general, the routines executed to implement the various implementations described herein, whether implemented as part of an operating system or a specific application, component, program, object, module or sequence of instructions, or even a subset thereof, will be referred to herein as "program code". Program code can include one or more instructions that are resident at various times in various memory and storage devices, and that, when read and executed by one or more processors, perform the steps necessary to execute steps or elements embodying the various aspects of the present disclosure. Moreover, while implementations have and hereinafter will be described in the context of fully functioning computers and systems, it will be appreciated that the various implementations described herein are capable of being distributed as a program product in a variety of forms, and that implementations can be implemented regardless of the particular type of computer readable media used to actually carry out the distribution.

Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.) among others.

In addition, various program code described hereinafter may be identified based upon the application within which it is implemented in a specific implementation. However, it should be appreciated that any particular program nomenclature that follows is used merely for convenience, and thus the present disclosure should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the present disclosure is not limited to the specific organization and allocation of program functionality described herein.

The environment illustrated in FIG. 1A is not intended to limit implementations disclosed herein. Indeed, other alternative hardware and/or software environments may be used without departing from the scope of implementations disclosed herein.

2. FM LIDAR for Automotive Applications

Figure 2:
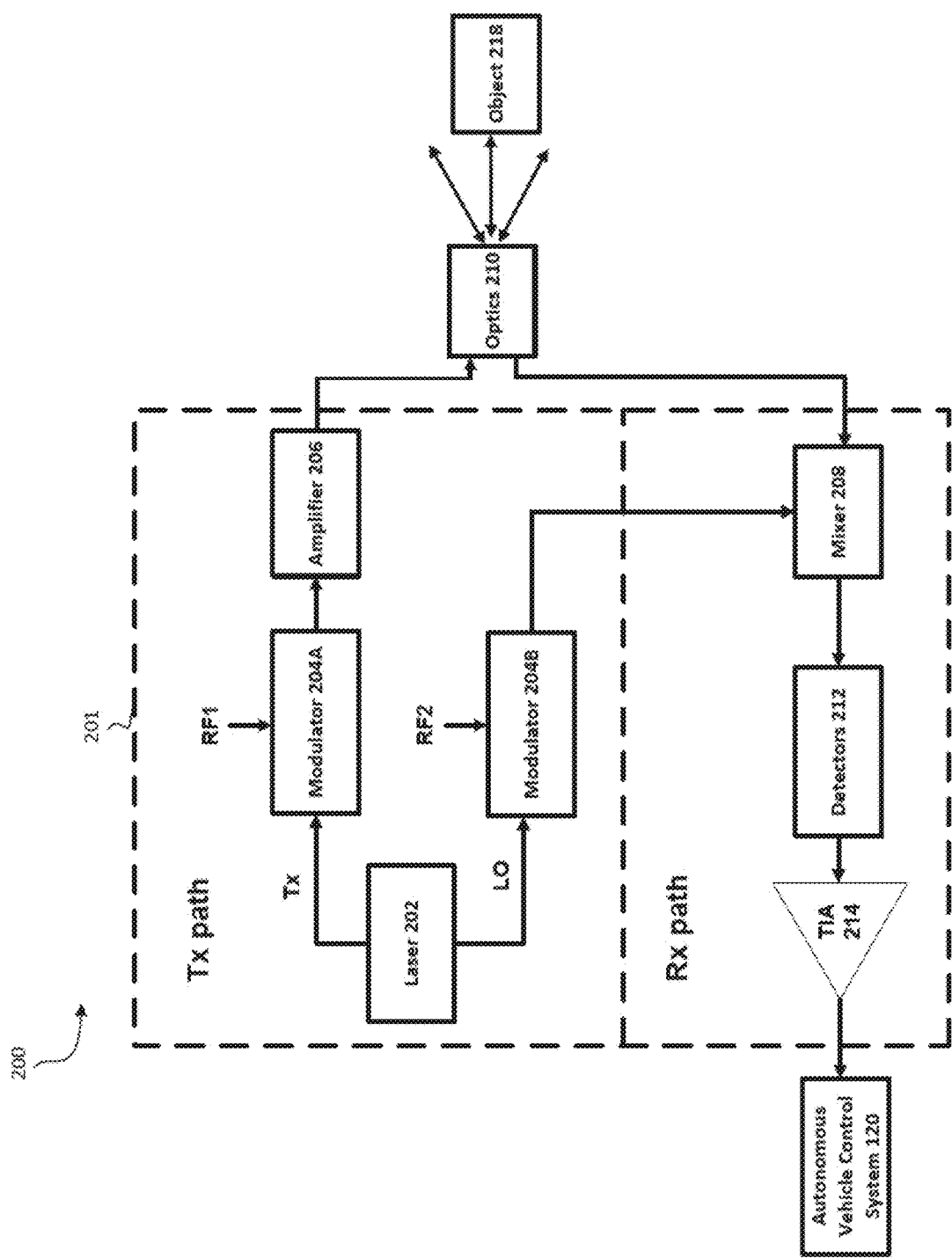
FIG. 2 is a block diagram illustrating an example of a lidar system for autonomous vehicles, according to some implementations.
Figure 3A:
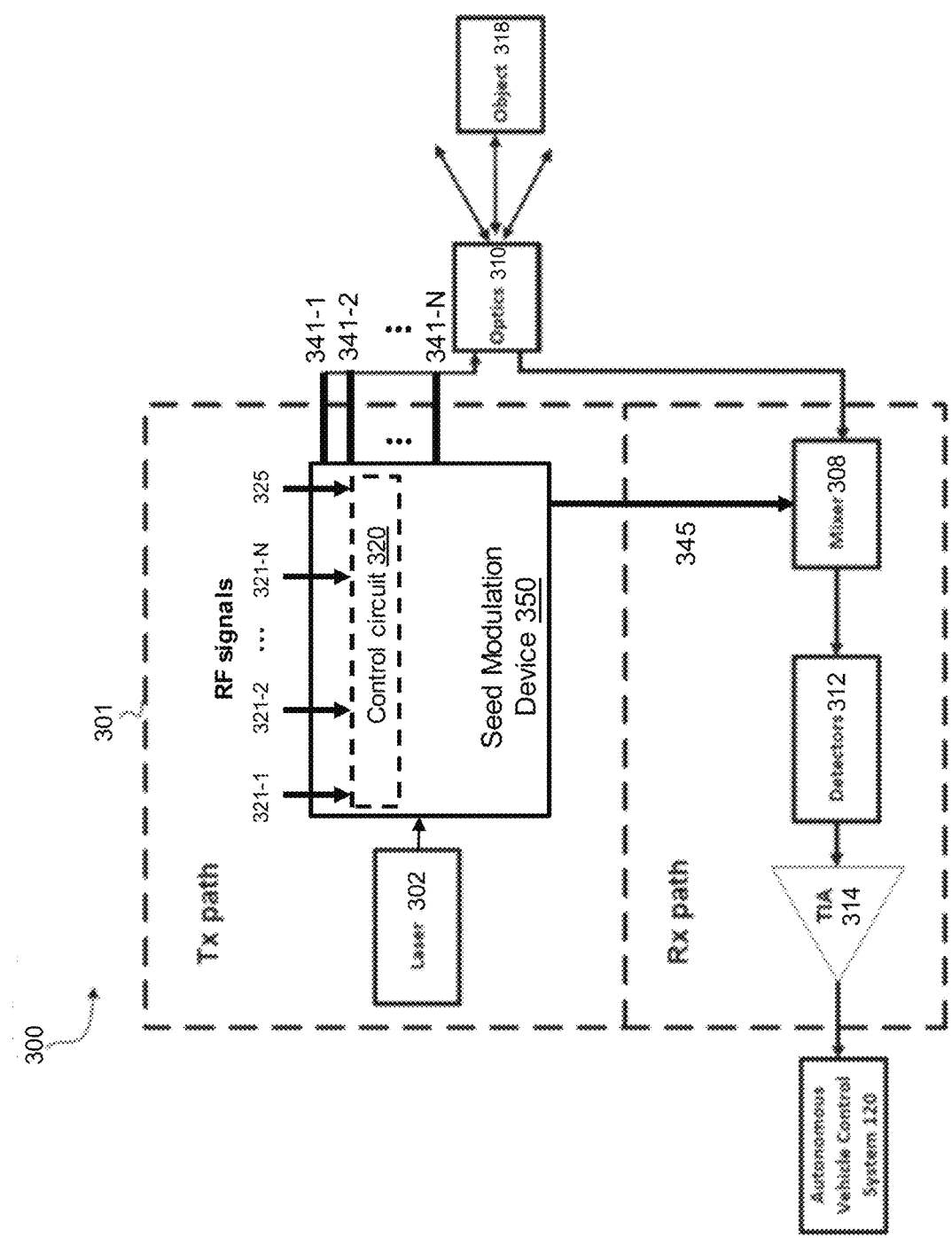
FIG. 3A is a block diagram illustrating an example of a lidar system according to some implementations.
Figure 4:
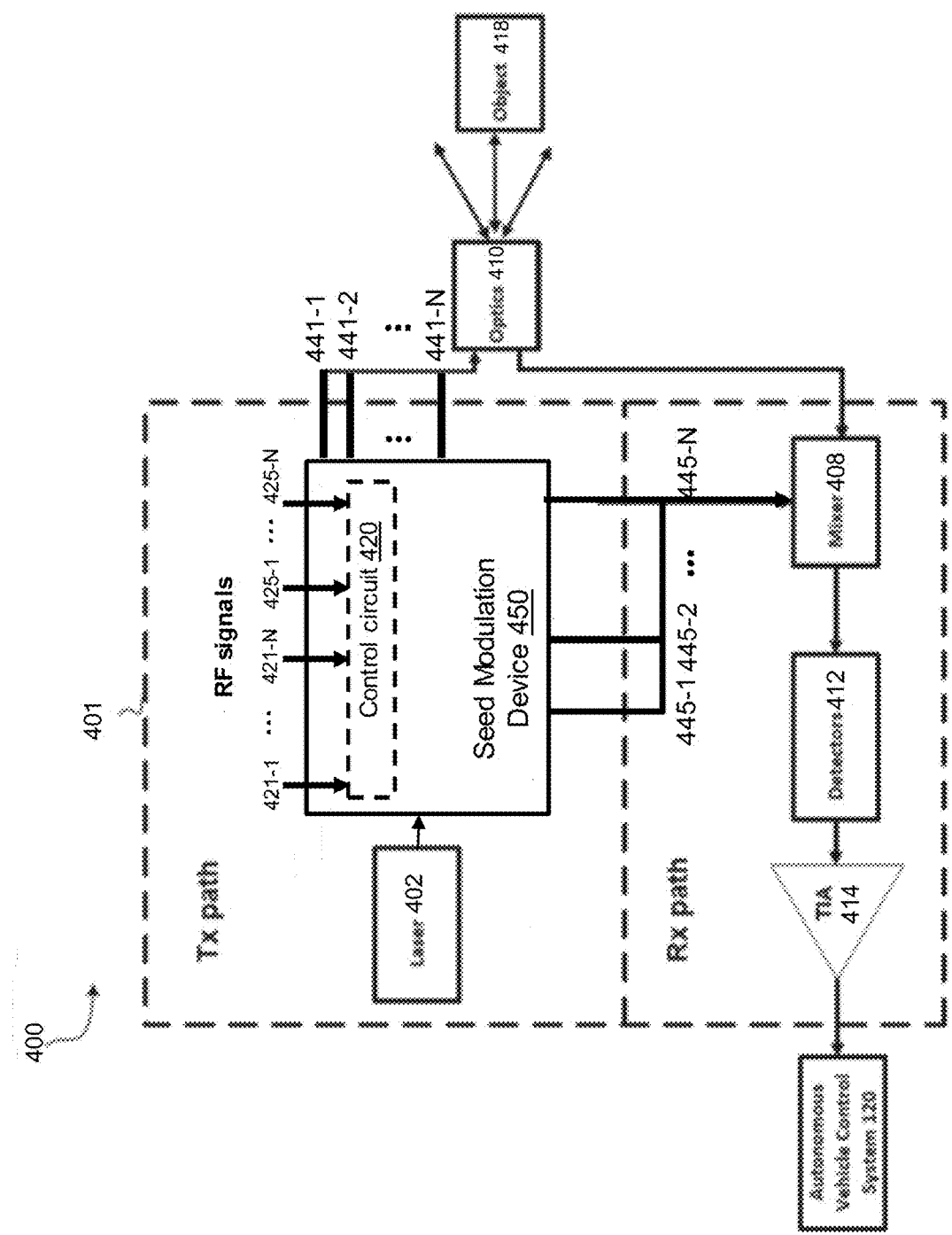
FIG. 4 is a block diagram illustrating another example of a lidar system according to some implementations.

A truck can include a lidar system (e.g., vehicle control system 120 in FIG. 1A, lidar system 201 in FIG. 2, lidar system 301 in FIG. 3A, lidar system 401 in FIG. 4, etc.). In some implementations, the lidar system can use frequency modulation to encode an optical signal and scatter the encoded optical signal into free-space using optics. By detecting the frequency differences between the encoded optical signal and a returned signal reflected back from an object, the frequency modulated (FM) lidar system can determine the location of the object and/or precisely measure the velocity of the object using the Doppler effect. An FM lidar system may use a continuous wave (referred to as, "FMCW lidar" or "coherent FMCW lidar") or a quasi-continuous wave (referred to as, "FMQW lidar"). The lidar system can use phase modulation (PM) to encode an optical signal and scatters the encoded optical signal into free-space using optics.

An FM or phase-modulated (PM) lidar system may provide substantial advantages over conventional lidar systems with respect to automotive and/or commercial trucking applications. To begin, in some instances, an object (e.g., a pedestrian wearing dark clothing) may have a low reflectivity, in that it only reflects back to the sensors (e.g., sensors 130 in FIG. 1A) of the FM or PM lidar system a low amount (e.g., 10% or less) of the light that hit the object. In other instances, an object (e.g., a shiny road sign) may have a high reflectivity (e.g., above 10%), in that it reflects back to the sensors of the FM lidar system a high amount of the light that hit the object.

Regardless of the object's reflectivity, an FM lidar system may be able to detect (e.g., classify, recognize, discover, etc.) the object at greater distances (e.g., 2×) than a conventional lidar system. For example, an FM lidar system may detect a low reflectivity object beyond 300 meters, and a high reflectivity object beyond 400 meters.

To achieve such improvements in detection capability, the FM lidar system may use sensors (e.g., sensors 130 in FIG. 1A). In some implementations, these sensors can be single photon sensitive, meaning that they can detect the smallest amount of light possible. While an FM lidar system may, in some applications, use infrared wavelengths (e.g., 950 nm, 1550 nm, etc.), it is not limited to the infrared wavelength range (e.g., near infrared: 800 nm-1500 nm; middle infrared: 1500 nm-5600 nm; and far infrared: 5600 nm-1,000,000 nm). By operating the FM or PM lidar system in infrared wavelengths, the FM or PM lidar system can broadcast stronger light pulses or light beams while meeting eye safety standards. Conventional lidar systems are often not single photon sensitive and/or only operate in near infrared wavelengths, requiring them to limit their light output (and distance detection capability) for eye safety reasons.

Thus, by detecting an object at greater distances, an FM lidar system may have more time to react to unexpected obstacles. Indeed, even a few milliseconds of extra time could improve safety and comfort, especially with heavy vehicles (e.g., commercial trucking vehicles) that are driving at highway speeds.

Another advantage of an FM lidar system is that it provides accurate velocity for each data point instantaneously. In some implementations, a velocity measurement is accomplished using the Doppler effect which shifts frequency of the light received from the object based at least one of the velocity in the radial direction (e.g., the direction vector between the object detected and the sensor) or the frequency of the laser signal. For example, for velocities encountered in on-road situations where the velocity is less than 100 meters per second (m/s), this shift at a wavelength of 1550 nanometers (nm) amounts to the frequency shift that is less than 130 megahertz (MHz). This frequency shift is small such that it is difficult to detect directly in the optical domain. However, by using coherent detection in FMCW, PMCW, or FMQW lidar systems, the signal can be converted to the RF domain such that the frequency shift can be calculated using various signal processing techniques. This enables the autonomous vehicle control system to process incoming data faster.

Instantaneous velocity calculation also makes it easier for the FM lidar system to determine distant or sparse data points as objects and/or track how those objects are moving over time. For example, an FM lidar sensor (e.g., sensors 130 in FIG. 1A) may only receive a few returns (e.g., hits) on an object that is 300 m away, but if those return give a velocity value of interest (e.g., moving towards the vehicle at >70 mph), then the FM lidar system and/or the autonomous vehicle control system may determine respective weights to probabilities associated with the objects.

Faster identification and/or tracking of the FM lidar system gives an autonomous vehicle control system more time to maneuver a vehicle. A better understanding of how fast objects are moving also allows the autonomous vehicle control system to plan a better reaction.

Another advantage of an FM lidar system is that it has less static compared to conventional lidar systems. That is, the conventional lidar systems that are designed to be more light-sensitive typically perform poorly in bright sunlight. These systems also tend to suffer from crosstalk (e.g., when sensors get confused by each other's light pulses or light beams) and from self-interference (e.g., when a sensor gets confused by its own previous light pulse or light beam). To overcome these disadvantages, vehicles using the conventional lidar systems often need extra hardware, complex software, and/or more computational power to manage this "noise."

In contrast, FM lidar systems do not suffer from these types of issues because each sensor is specially designed to respond only to its own light characteristics (e.g., light beams, light waves, light pulses). If the returning light does not match the timing, frequency, and/or wavelength of what was originally transmitted, then the FM sensor can filter (e.g., remove, ignore, etc.) out that data point. As such, FM lidar systems produce (e.g., generates, derives, etc.) more accurate data with less hardware or software requirements, enabling safer and smoother driving.

Lastly, an FM lidar system is easier to scale than conventional lidar systems. As more self-driving vehicles (e.g., cars, commercial trucks, etc.) show up on the road, those powered by an FM lidar system likely will not have to contend with interference issues from sensor crosstalk. Furthermore, an FM lidar system uses less optical peak power than conventional lidar sensors. As such, some or all of the optical components for an FM lidar can be produced on a single chip, which produces its own benefits, as discussed herein.

3. Commercial Trucking

Figure 1B:
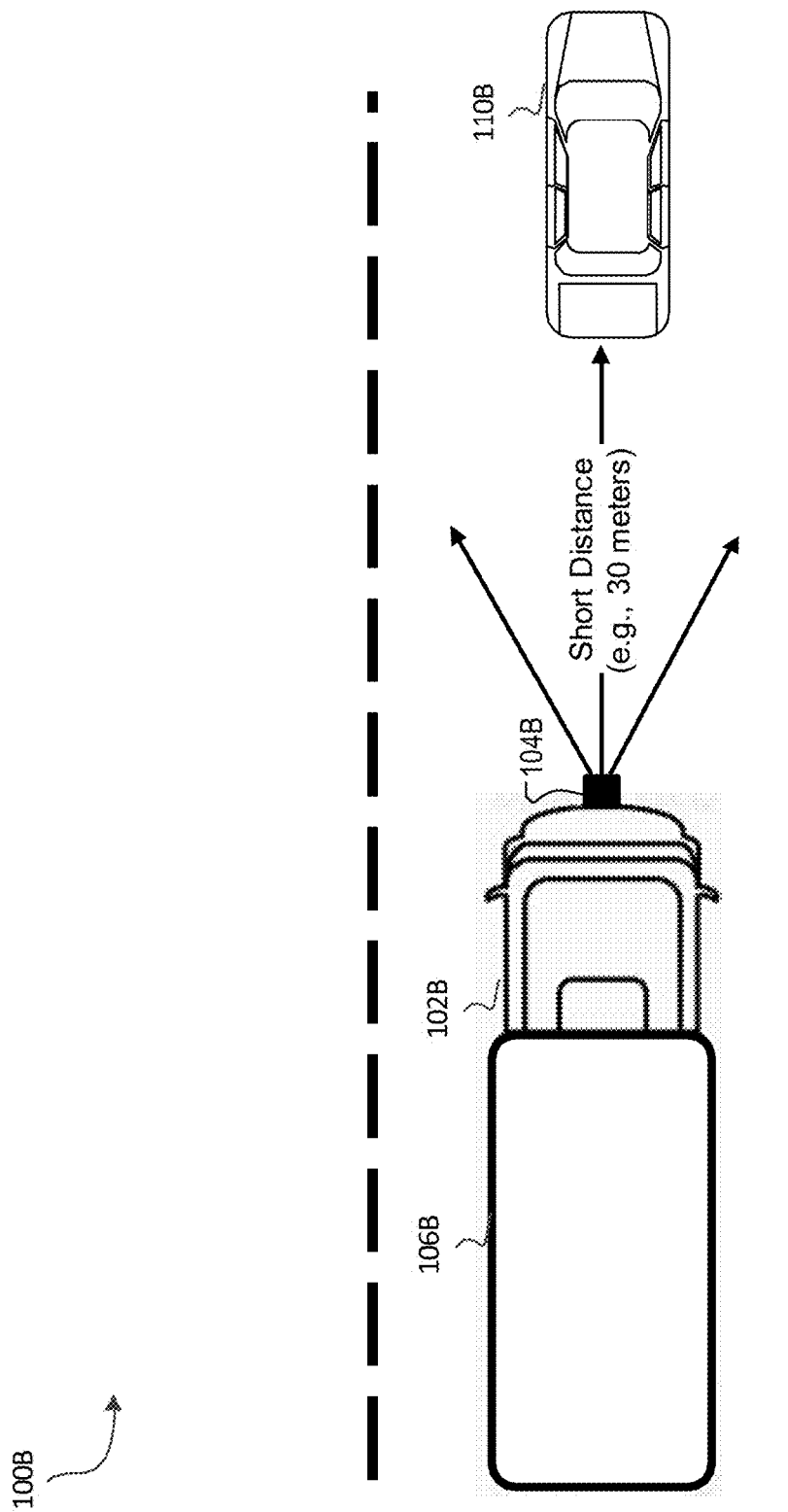
FIG. 1B is a block diagram illustrating an example of a system environment for autonomous commercial trucking vehicles, according to some implementations.

FIG. 1B is a block diagram illustrating an example of a system environment for autonomous commercial trucking vehicles, according to some implementations. The environment 100B includes a commercial truck 102B for hauling cargo 106B. In some implementations, the commercial truck 102B may include vehicles configured to long-haul freight transport, regional freight transport, intermodal freight transport (i.e., in which a road-based vehicle is used as one of multiple modes of transportation to move freight), and/or any other road-based freight transport applications. The commercial truck 102B may be a flatbed truck, a refrigerated truck (e.g., a reefer truck), a vented van (e.g., dry van), a moving truck, etc. The cargo 106B may be goods and/or produce. The commercial truck 102B may include a trailer to carry the cargo 106B, such as a flatbed trailer, a lowboy trailer, a step deck trailer, an extendable flatbed trailer, a sidekit trailer, etc.

The environment 100B includes an object 110B (shown in FIG. 1B as another vehicle) that is within a distance range that is equal to or less than 30 meters from the truck.

The commercial truck 102B may include a lidar system 104B (e.g., an FM lidar system, vehicle control system 120 in FIG. 1A, lidar system 201 in FIG. 2, lidar system 301 in FIG. 3A, lidar system 401 in FIG. 4, etc.) for determining a distance to the object 110B and/or measuring the velocity of the object 110B. Although FIG. 1B shows that one lidar system 104B is mounted on the front of the commercial truck 102B, the number of lidar system and the mounting area of the lidar system on the commercial truck are not limited to a particular number or a particular area. The commercial truck 102B may include any number of lidar systems 104B (or components thereof, such as sensors, modulators, coherent signal generators, etc.) that are mounted onto any area (e.g., front, back, side, top, bottom, underneath, and/or bottom) of the commercial truck 102B to facilitate the detection of an object in any free-space relative to the commercial truck 102B.

As shown, the lidar system 104B in environment 100B may be configured to detect an object (e.g., another vehicle, a bicycle, a tree, street signs, potholes, etc.) at short distances (e.g., 30 meters or less) from the commercial truck 102B.

Figure 1C:
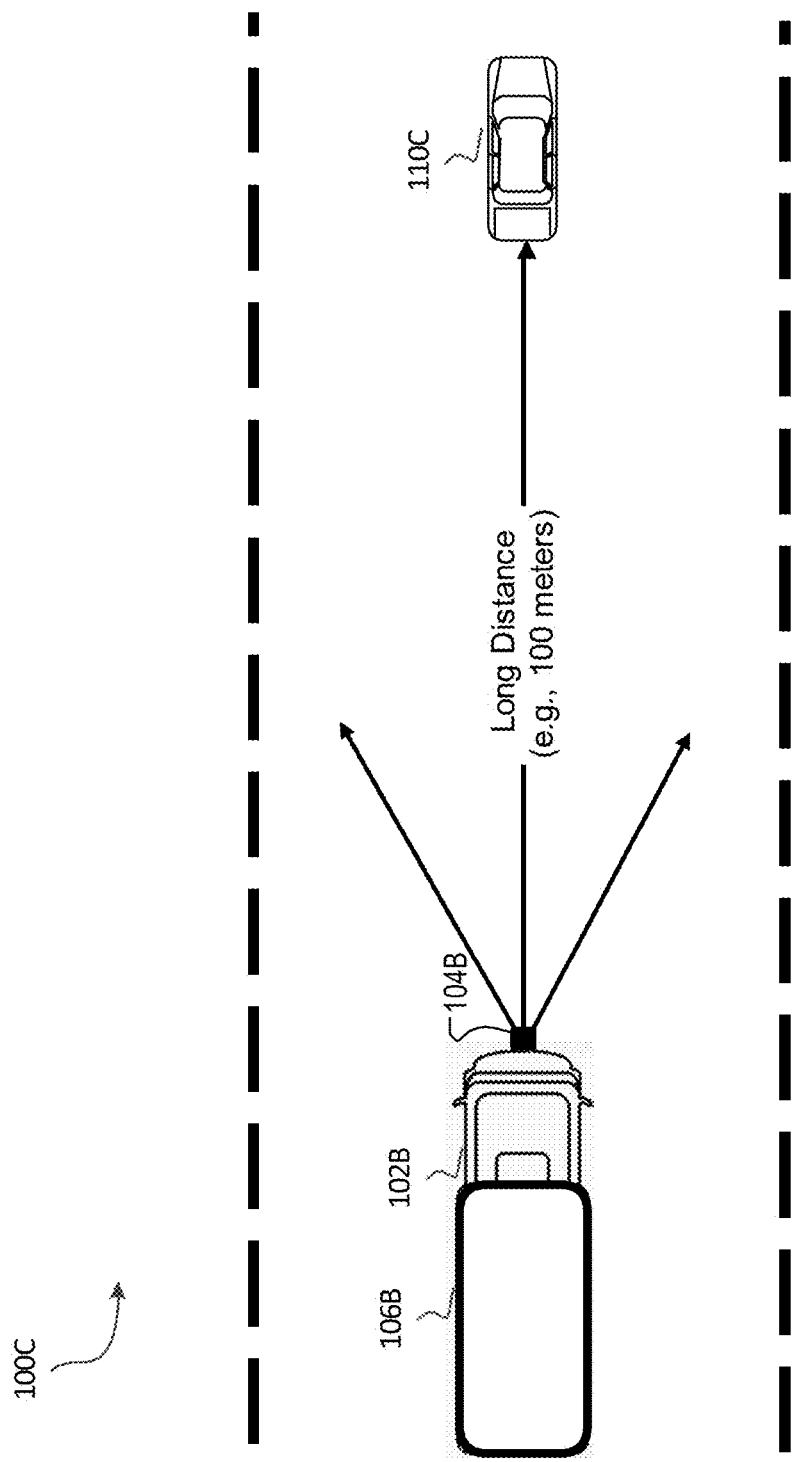
FIG. 1C is a block diagram illustrating an example of a system environment for autonomous commercial trucking vehicles, according to some implementations.

FIG. 1C is a block diagram illustrating an example of a system environment for autonomous commercial trucking vehicles, according to some implementations. The environment 100C includes the same components (e.g., commercial truck 102B, cargo 106B, lidar system 104B, etc.) that are included in environment 100B.

The environment 100C includes an object 110C (shown in FIG. 1C as another vehicle) that is within a distance range that is (i) more than 30 meters and (ii) equal to or less than 150 meters from the commercial truck 102B. As shown, the lidar system 104B in environment 100C may be configured to detect an object (e.g., another vehicle, a bicycle, a tree, street signs, potholes, etc.) at a distance (e.g., 100 meters) from the commercial truck 102B.

Figure 1D:
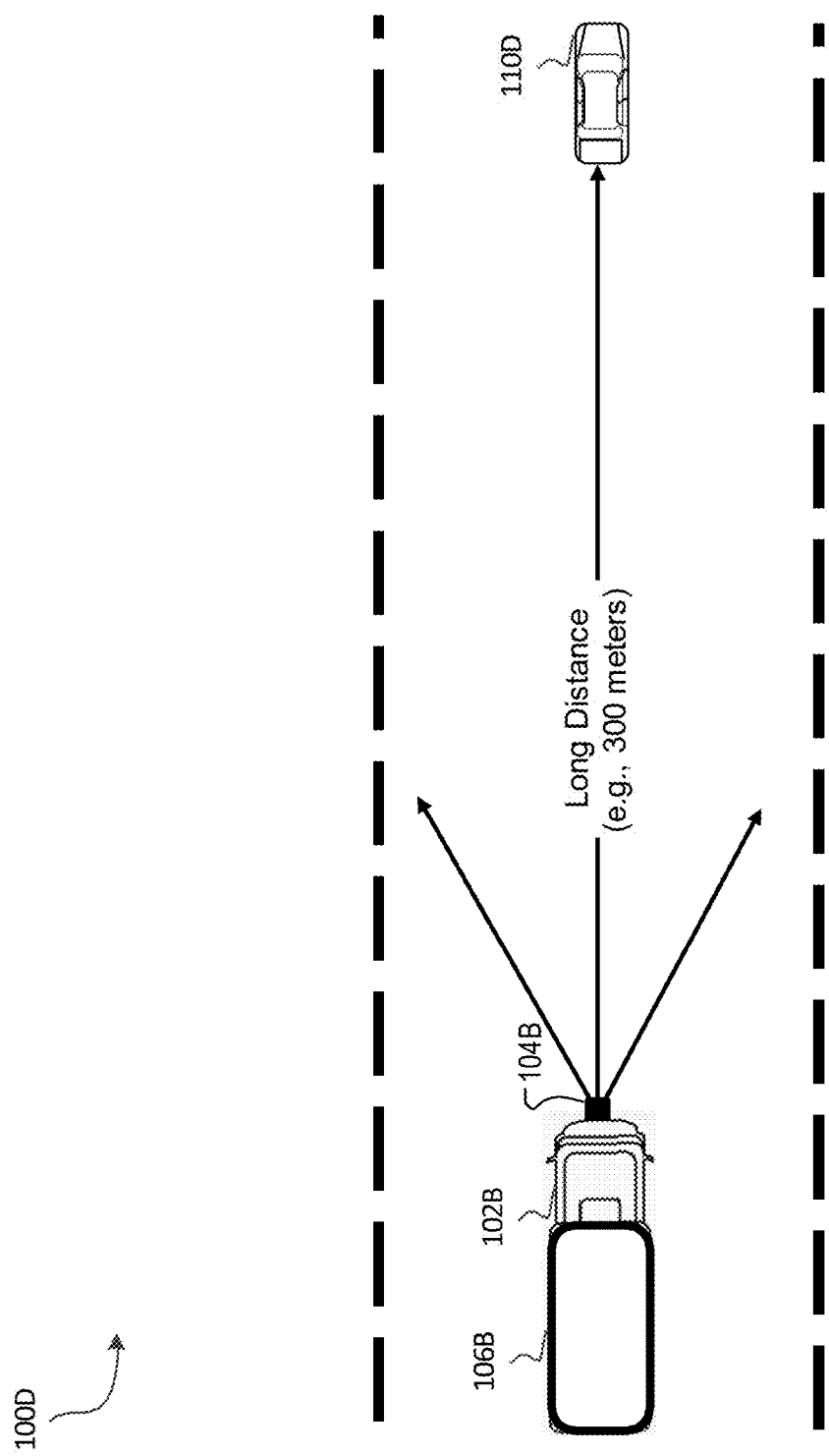
FIG. 1D is a block diagram illustrating an example of a system environment for autonomous commercial trucking vehicles, according to some implementations.

FIG. 1D is a block diagram illustrating an example of a system environment for autonomous commercial trucking vehicles, according to some implementations. The environment 100D includes the same components (e.g., commercial truck 102B, cargo 106B, lidar system 104B, etc.) that are included in environment 100B.

The environment 100D includes an object 110D (shown in FIG. 1D as another vehicle) that is within a distance range that is more than 150 meters from the commercial truck 102B. As shown, the lidar system 104B in environment 100D may be configured to detect an object (e.g., another vehicle, a bicycle, a tree, street signs, potholes, etc.) at a distance (e.g., 300 meters) from the commercial truck 102B.

In commercial trucking applications, it is important to effectively detect objects at all ranges due to the increased weight and, accordingly, longer stopping distance required for such vehicles. FM lidar systems (e.g., FMCW and/or FMQW systems) or PM lidar systems are well-suited for commercial trucking applications due to the advantages described above. As a result, commercial trucks equipped with such systems may have an enhanced ability to safely move both people and goods across short or long distances, improving the safety of not only the commercial truck but of the surrounding vehicles as well. In various implementations, such FM or PM lidar systems can be used in semiautonomous applications, in which the commercial truck has a driver and some functions of the commercial truck are autonomously operated using the FM or PM lidar system, or fully autonomous applications, in which the commercial truck is operated entirely by the FM or lidar system, alone or in combination with other vehicle systems.

4. Continuous Wave Modulation and Quasi-Continuous Wave Modulation

In a lidar system that uses CW modulation, the modulator modulates the laser light continuously. For example, if a modulation cycle is 10 seconds, an input signal is modulated throughout the whole 10 seconds. Instead, in a lidar system that uses quasi-CW modulation, the modulator modulates the laser light to have both an active portion and an inactive portion. For example, for a 10 second cycle, the modulator modulates the laser light only for 8 seconds (sometimes referred to as, "the active portion"), but does not modulate the laser light for 2 seconds (sometimes referred to as, "the inactive portion"). By doing this, the lidar system may be able to reduce power consumption for the 2 seconds because the modulator does not have to provide a continuous signal.

In Frequency Modulated Continuous Wave (FMCW) lidar for automotive applications, it may be beneficial to operate the lidar system using quasi-CW modulation where FMCW measurement and signal processing methodologies are used, but the light signal is not in the on-state (e.g., enabled, powered, transmitting, etc.) all the time. In some implementations, Quasi-CW modulation can have a duty cycle that is equal to or greater than 1% and up to 50%. If the energy in the off-state (e.g., disabled, powered-down, etc.) can be expended during the actual measurement time then there may be a boost to signal-to-noise ratio (SNR) and/or a reduction in signal processing requirements to coherently integrate all the energy in the longer time scale.

5. LIDAR System for Autonomous Vehicles

FIG. 2 is a block diagram illustrating an example environment of a lidar system for autonomous vehicles, according to some implementations. The environment 200 includes a lidar system 201 that includes a transmit (Tx) path and a receive (Rx) path. The Tx path includes one or more Tx input/output ports (not shown in FIG. 2) and the Rx path includes one or more Rx input/output ports (not shown in FIG. 2).

In some implementations, a semiconductor substrate and/or semiconductor package may include the Tx path and the Rx. In some implementations, the semiconductor substrate and/or semiconductor package may include at least one of silicon photonics circuitry, photonic lightwave circuit (PLC), or III-V semiconductor circuitry.

In some implementations, a first semiconductor substrate and/or a first semiconductor package may include the Tx path and a second semiconductor substrate and/or a second semiconductor package may include the Rx path. In some arrangements, the Rx input/output ports and/or the Tx input/output ports may occur (or be formed/disposed/located/placed) along one or more edges of one or more semiconductor substrates and/or semiconductor packages.

The environment 200 includes one or more optics 210 (e.g., an oscillatory scanner, a unidirectional scanner, a Risley prism, a circulator optic, and/or a beam collimator, etc.) that are coupled to the lidar system 201. In some implementations, the one or more optics 210 may be coupled to the Tx path via the one or more Tx input/output ports. In some implementations, the one or more optics 210 may be coupled to the Rx path via the one or more Rx input/output ports.

The environment 200 includes a vehicle control system 120 (e.g., vehicle control system 120 in FIG. 1) that is coupled to the lidar system 201. In some implementations, the vehicle control system 120 may be coupled to the Rx path via the one or more Rx input/output ports.

The Tx path may include a laser source 202, a modulator 204A, a modulator 204B, and an amplifier 206. The Rx path may include a mixer 208, a detector 212, and a transimpedance amplifier (TIA) 214. Although FIG. 2 shows only a select number of components and only one input/output channel; the environment 200 may include any number of components and/or input/output channels (in any combination) that are interconnected in any arrangement to facilitate combining multiple functions of a lidar system, to support the operation of a vehicle.

The laser source 202 may be configured to generate a light signal (or beam) that is derived from (or associated with) a local oscillator (LO) signal. In some implementations, the light signal may have an operating wavelength that is equal to or substantially equal to 1550 nanometers. In some implementations, the light signal may have an operating wavelength that is between 1250 nanometers and 1400 nanometers.

The laser source 202 may be configured to provide the light signal to the modulator 204A, which is configured to modulate a phase and/or a frequency of the light signal based on a first radio frequency (RF) signal (shown in FIG. 2 as, "RF1") and using Continuous Wave (CW) modulation or quasi-CW modulation to generate a modulated light signal. The modulator 204A may be configured to send the modulated light signal to the amplifier 206. The amplifier 206 may be configured to amplify the modulated light signal to generate an amplified light signal to the optics 210.

The optics 210 may be configured to steer the amplified light signal that it receives from the Tx path into an environment within a given field of view toward an object 218, may receive a returned signal reflected back from the object 218, and provide the returned signal to the mixer 208 of the Rx path.

The laser source 202 may be configured to provide the LO signal to the modulator 204B, which is configured to modulate a phase and/or a frequency of the LO signal based on a second RF signal (shown in FIG. 2 as, "RF2") and using Continuous Wave (CW) modulation or quasi-CW modulation to generate a modulated LO signal and send the modulated LO signal to the mixer 208 of the Rx path.

The mixer 208 may be configured to mix (e.g., combine, multiply, etc.) the modulated LO signal with the returned signal to generate a down-converted signal and send the down-converted signal to the detector 212. In some arrangements, the mixer 208 may be configured to send the modulated LO signal to the detector 212.

The detector 212 may be configured to generate an electrical signal based on the down-converted signal and send the electrical signal to the TIA 214. In some arrangements, the detector 212 may be configured to generate an electrical signal based on the down-converted signal and the modulated signal.

The TIA 214 may be configured to amplify the electrical signal and send the amplified electrical signal to the vehicle control system 120.

In some implementations, the TIA 214 may have a peak noise-equivalent power (NEP) that is less than 5 picoWatts per square root Hertz (i.e., $5\times10^{-12}$ Watts per square root Hertz). In some implementations, the TIA 214 may have a gain between 4 kiloohms and 25 kiloohms In some implementations, detector 212 and/or TIA 214 may have a 3 decibel bandwidth between 80 kilohertz (kHz) and 450 megahertz (MHz).

The vehicle control system 120 may be configured to determine a distance to the object 218 and/or measures the velocity of the object 218 based on the one or more electrical signals that it receives from the TIA.

In some implementations, modulator 204A and/or modulator 204B may have a bandwidth between 400 megahertz (MHz) and 1000 (MHz).

In some implementations, the modulator 204A may be configured to send a first modulated light (optical) signal and a second modulated light (optical) signal to the amplifier 206. The amplifier 206 may be configured to amplify the first and second modulated light signals to generate amplified light signals to the optics 210. The optics 210 may be configured to steer the first and second modulated light signals that it receives from the Tx path into an environment within a given field of view toward an object 218, may receive corresponding first and second returned signals reflected back from the object 218, and provide the first and second returned signals to the mixer 208 of the Rx path. The modulator 204B may be configured to generate (1) a first modulated LO signal associated with the first modulated light signal and (2) a second modulated LO signal associated with the second modulated light signal, and send the first and second modulated LO signals to the mixer 208 of the Rx path. The mixer 208 may be configured to pair (e.g., associate, link, identify, etc.) the first returned light signal and the first modulated LO signal, and mix (e.g., combine, multiply, etc.) the first returned light signal and the first modulated LO signal to generate a first down-converted signal and send the first down-converted signal to the detector 212. Similarly, the mixer 208 may be configured to pair the second returned light signal and the second modulated LO signal, and mix the second returned light signal and the second modulated LO signal to generate a second down-converted signal and send the second down-converted signal to the detector 212. The detector 212 may be configured to generate first and second electrical signals based on the first and second down-converted signal, respectively. The vehicle control system 120 may be configured to determine a distance to the object 218 and/or measures the velocity of the object 218 based on the first and second electrical signals, received via TIA 214.

6. A LIDAR System Including a Seed Modulation Module

A lidar sensor system may include a modulator (e.g., Mach-Zehnder modulator) configured to receive an optical signal from a laser source and modulate the optical signal prior to transmitting the optical signal to an environment. The lidar sensor system may also use temporal multiplexing to overcome hardware requirements. For example, multiple transmit (TX) channels may be temporally multiplexed to share limited hardware resources (e.g., analog-to-digital converters (ADC)). Similarly, multiple local oscillator (LO) channels may be temporally multiplexed to share limited hardware resources (e.g., photo receivers/detectors). In some cases, temporal multiplexing may be performed by optical switches or electro-optical switches. As photonic integrated circuits (PICs) are nowadays extensively used for cost saving, there is a need for a PIC module/device to efficiently perform modulation and multiplexing.

To solve these problem, in some implementations, a lidar sensor system (e.g., FMCW or other coherent lidar sensor systems) may include a seed modulation device (or seed modulation module) configured to perform modulation and multiplexing at the same time. In some implementations, the seed modulation device may include one or more optical amplifiers (e.g., semiconductor optical amplifiers (SOAs), erbium-doped fiber amplifiers (EDFAs), fiber Raman amplifiers (FRAs)) for time sequencing of amplifier, thereby temporally multiplexing a plurality of transmit (TX) optical signals. In some implementations, the seed modulation device may perform amplitude modulation (AM) or phase modulation using one or more SOAs. For example, the seed modulator device may generate a modulated optical signal in a range between −20 dbm to 0 dbm with respect to the original input optical signal. The seed modulation device may bias a SOA in forward or backward depending on a time sequence controlled by a control circuit.

In some implementations, a seed modulation device may include an input leg (or input optical path), a first leg (or first optical path) branched from the input optical path at one end thereof, and a second leg (or second optical path) branched from the input optical path at one end thereof. In some implementation, the input optical path may be formed/disposed/positioned between the first optical path and the second optical path. The seed modulation device may receive a light beam (or optical signal) at the input optical path. In some implementations, the device may receive an optical signal at the input optical path from a laser source. The first optical path may function as a local oscillator (LO) path and the second optical path may function as a TX path. The device may include a plurality of TX paths branched from the second optical path at one ends thereof. In some implementations, the device may include a laser source therein.

In some implementations, the seed modulation device may include an input port coupled to the input optical path and configured to receive the optical signal from the laser source. The device may include an LO output port coupled/connected to the other end of the first optical path, and a plurality of TX output ports coupled/connected to the other ends of the plurality of TX paths, respectively.

In some implementations, the seed modulation device may include one or more first optical amplifiers coupled to the first optical path. The one or more first optical amplifiers may include a SOA. In some implementations, the device may include a plurality of first phase modulators coupled to the first optical path. The plurality of first phase modulators may include an electro-optic modulator or a liquid crystal modulator. The one or more first optical amplifiers may be formed/disposed/positioned between the plurality of first phase modulators and the LO output port.

In some implementations, the seed modulation device may include a plurality of second optical amplifiers respectively coupled to the plurality of TX paths. Each of the plurality of second optical amplifiers may be a SOA. In some implementations, the device may include a plurality of second phase modulators coupled to the second optical path. The plurality of second phase modulators may include an electro-optic modulator or a liquid crystal modulator. Each of the plurality of second optical amplifiers may be formed/disposed/positioned between the plurality of second phase modulators and a corresponding one of the TX output ports.

In some implementations, the seed modulation device may include a control circuit configured to generate, based on an electric signal, a control signal to turn on/off each of the one or more first optical amplifiers and the plurality of second optical amplifiers. In some implementations, the control circuit is not included in the device but included in a lidar sensor system. The electric signal may include one or more electromagnetic signals, e.g., one or more radio frequency (RF) signals. The control signal may indicate a time sequence for turning on/off each optical amplifier, thereby temporally multiplexing outputs of optical amplifiers. For example, the device may temporally multiplex output signals of the plurality of second optical amplifiers according to a time sequence, and activate/deactivate output signals of the one or more first optical amplifiers in synchronization with the time sequence of the plurality of second optical amplifiers. In other words, the device may control the plurality of second optical amplifiers (e.g., SOAs) to temporally multiplex TX channels by turning on/off the plurality of TX paths. In some implementations, the device may output signals of the plurality of second optical amplifiers according to a plurality of respective time sequences, which are independent from each other.

In some implementations, the seed modulation device may turn on/off each of the plurality of second optical amplifiers with a high degree of fidelity, for example with 20-25 dB suppression ratio. In some implementations, the seed modulation device may turn on/off each SOA by biasing the SOA in forward or backward. The device may forward-bias a SOA to create emission of photons, thereby causing the input optical signal to pass through the SOA. On the other hand, the device may backward-bias the SOA to suppress an optical gain, thereby turning off the input optical signal. For example, if all of the plurality of second optical amplifiers (e.g., SOAs) are forward-biased, when the input optical path receives a light beam of 20 milliwatt (mW), the light beam may be divided into two light beams of 10 mW for the first and second optical paths, and further divided into a plurality of light beams (of 2 to 5 mW, for example) for the plurality of TX paths, respectively. On the other hand, if none of the plurality of second optical amplifiers (e.g., SOAs) are biased (either forward-biased or backward-biased), a light beam of 1 mW may flow through each of the plurality of TX paths. If one of the SOA is forward-biased, then that SOA may output a light beam of 2 to 5 mW through the corresponding TX path, while outputting substantially no light beam if that SOA is backward-biased.

In some implementations, the seed modulation device may turn on the first optical amplifiers in synchronization with turning on one of the plurality of TX paths. In some implementations, the device may turn on the first optical path in synchronization with turning on any one of the plurality of TX paths. The device may turn on the first optical path by turning on the first SOA.

In some implementations, the seed modulation device may include a plurality of LO paths branched from the first optical path at one ends thereof. The device may include a plurality of third optical amplifiers respectively coupled to the plurality of LO paths. Each of the plurality of third optical amplifiers may be a SOA. The device may temporally multiplex output signals of the plurality of third optical amplifiers according to a time sequence. In other words, the device may control the plurality of third optical amplifiers (e.g., SOAs) to temporally multiplex LO channels by turning on/off the plurality of LO paths. In some implementations, the device may output signals of the plurality of third optical amplifiers according to a plurality of respective time sequences, which are independent from each other.

In some implementations, the seed modulation device may perform amplitude modulation (AM) or phase modulation (PM) using one or more SOAs. For example, the device may perform AM or PM of an input optical signal to generate modulated TX signals using a plurality of SOAs coupled to the plurality of second optical paths. Similarly, the device may perform AM or PM of an input optical signal to generate modulated LO signals using one or more SOAs coupled to the first optical path. In some implementations, the device may perform AM or PM of an input optical signal by changing or varying a driving current of each of the plurality of SOAs. The device may perform AM or PM of an input optical signal by changing or varying an amplitude of a driving current of a SOA. In some implementations, the device may perform AM and PM of an input optical signal at the same time by changing or varying an amplitude of a driving current of a SOA. In some implementations, the device may perform PM of an input optical signal by changing or varying a driving current of a SOA to change the effective length of an active region of the SOA. The device may perform AM or PM of an input optical signal intertwined with multiplexing of modulated optical signals. In this manner, the device can slowly modulate the input optical signal to stabilize the phase thereof (e.g., no phase drift), while performing modulation and multiplexing at the same time.

In some implementations, a control circuit (which may or may not be included in the seed modulation device) may be configured to change or vary, based on an electric signal, a driving current of each of the one or more first optical amplifiers and the plurality of second optical amplifiers to perform AM or PM of an input optical signal. In some implementations, the electric signal may include one or more electromagnetic signals, e.g., one or more RF signals. In some implementations, the control signal may indicate (1) a time sequence for turning on/off each optical amplifier and/or (2) a driving current of each optical amplifier.

In some implementations, the seed modulation device may include all of its components (e.g., optical paths, optical amplifiers, phase modulators, etc.) formed or disposed on a single substrate. In some implementations, the seed modulation device may be a III-V semiconductor-based integrated photonic device in which all of its components are made of III-V materials and formed/disposed on a single substrate made of III-V materials. The III-V materials may include at least one of indium phosphide (InP), indium monoarsenide (InAs), or gallium and arsenide (GaAs).

In some implementations, the seed modulation device may include at least one of silicon photonics circuitry, photonic lightwave circuit (PLC), or III-V semiconductor circuitry in which all of its components (e.g., optical paths, optical amplifiers, phase modulators, etc.) are formed or disposed on a single substrate. In some implementations, all of the components of the device may be formed in a single layer to form a horizontal structure of an integrated circuit. In some implementations, components of the device may be formed or disposed over multiple layers stacked on a single substrate to form a vertical structure of an integrated circuit. For example, the device may include phase modulators implemented as one or more PLC modules, optical paths implemented as silicon photonics circuitry, and SOAs implemented as III-V modules, all of which are disposed/formed on a single substrate.

According to certain aspects, implementations in the present disclosure relate to a device including an input optical path, a first optical path, a plurality of second optical paths, a first optical amplifier, a plurality of second optical amplifiers, and a control circuit. The input optical path may receive, at one end thereof, a beam from a laser source. The first optical path and a plurality of second optical paths may be respectively branched from the other end of the input optical path. The first optical amplifier may be coupled to the first optical path. The plurality of second optical amplifiers may be respectively coupled to the plurality of second optical paths. The control circuit may selectively turn on one of the plurality of second optical amplifiers to output a modulated optical signal of the beam. The control circuit may turn on the first optical amplifier, in synchronization with turning on any one of the plurality of second optical amplifiers, to output a local oscillator (LO) signal.

In some implementations, the plurality of second optical amplifiers may include a plurality of semiconductor optical amplifiers (SOAs). The control circuit may be configured to turn on or off the plurality of SOAs to temporally multiplex output signals of the plurality of SOAs. The control circuit may be configured to change a driving current of one of a plurality of SOAs to perform at least one of amplitude modulation or phase modulation of the beam.

In some implementations, the device may include at least one of silicon photonics circuitry, photonic lightwave circuit (PLC), or III-V semiconductor circuitry. The device may be III-V semiconductor circuitry.

In some implementations, the first optical amplifier may be a first SOA. The control circuit may be configured to turn on or off the first SOA to output the LO signal according to a time sequence. The control circuit may be configured to change a driving current of the first SOA to perform at least one of amplitude modulation or phase modulation of the beam.

In some implementations, the first optical amplifier may include a plurality of third optical amplifiers. The control circuit may be configured to selectively turn on one of the plurality of third optical amplifiers to output a corresponding LO optical signal.

In some implementations, the device may further include one or more phase modulators coupled to the second optical path. The device may further include one or more phase modulators coupled to the first optical path. The number of the one or more phase modulators coupled to the first optical path may be the same as the number of one or more phase modulators coupled to the second optical path.

In some implementations, the device may further include a first output port coupled to an end of the first optical path, and a plurality of second output ports coupled to respective ends of the plurality of second optical paths. The control circuit may be configured to output the modulated optical signal of the beam to a corresponding one of the plurality of second output ports, and output the LO signal to the first output port.

In some implementations, a light detection and ranging (lidar) system may include the device, a laser source configured to generate a beam, a plurality of transmit (TX) channels, and one or more optical components. The one or more optical components may be configured to receive, from the device, a first modulated optical signal and a first LO signal that is associated with the first modulated optical signal. The one or more optical components may be configured to receive, from the device, a second modulated optical signal and a second LO signal that is associated with the second modulated optical signal. The one or more optical components may be configured to transmit the first and second modulated optical signals at first and second TX channels, among the plurality of TX channels, respectively, to an environment. The one or more optical components may be configured to receive first and second returned optical signals that are reflected from one or more objects in the environment. The one or more optical components may be configured to pair the first and second returned optical signals with the first and second LO signals, respectively.

According to certain aspects, implementations in the present disclosure relate to a method of generating modulated optical signals in circuitry. The method may include receiving, by the circuitry from a laser source, a beam at an input optical path of the circuitry. The circuitry may include the input optical path, a first optical path and a plurality of second optical paths, respectively branched from the input optical path, a first optical amplifier coupled to the first optical path, and a plurality of second optical amplifiers respectively coupled to the plurality of second optical paths. The method may include receiving, by the circuitry from a laser source, a beam at the input optical path. The method may include selectively turning on, by the circuitry, one of the plurality of second optical amplifiers to output a modulated optical signal of the beam. The method may include turning on, by the circuitry, the first optical amplifier, in synchronization with turning on any one of the plurality of second optical amplifiers, to output a local oscillator (LO) signal.

In some implementations, the plurality of second optical amplifiers may include a plurality of semiconductor optical amplifiers (SOAs). The method may include turning on or off one of the plurality of SOAs to temporally multiplex output signals of the plurality of SOAs. The method may include changing a driving current of one of the plurality of SOAs to perform at least one of amplitude modulation or phase modulation of the beam.

Various implementations in the present disclosure have one or more of the following advantages and benefits.

First, implementations in the present disclosure can provide useful techniques for efficiently performing temporal multiplexing of TX signals and/or LO signals using optical amplifiers (e.g., SOAs) to overcome hardware requirements. For example, a seed modulation device according to some implementations can generate multiple modulated optical signals, and temporally multiplex the multiple modulated optical signals for multiple transmit (TX) channels and/or multiple (LO) channels. This multiplexing can enable sharing of limited hardware resources (e.g., analog-to-digital converters (ADC) or photo receivers/detectors).

Second, implementations in the present disclosure can provide useful techniques for stably performing modulation (e.g., AM or PM) by changing or varying a driving current of an SOA. For example, the device may perform AM and/or PM of an input optical signal intertwined with multiplexing of modulated optical signals. In this manner, the device can slowly modulate the input optical signal to stabilize the phase thereof (e.g., no phase drift), while performing modulation and multiplexing at the same time.

Third, implementations in the present disclosure can provide useful techniques for integrating components of a seed modulation device into an integrated circuit, thereby achieving significant cost saving (e.g., 5 times less than that of a conventional implementation with circuitry on printed circuit boards (PCBs)). For example, the seed modulation device may include at least one of silicon photonics circuitry, photonic lightwave circuit (PLC), or III-V semiconductor circuitry in which all of its components (e.g., optical paths, optical amplifiers, phase modulators, etc.) are formed or disposed on a single substrate. In some implementations, the seed modulation device may be a III-V semiconductor-based integrated photonic device in which all of its components are made of III-V materials and formed/disposed on a single substrate made of III-V materials.

FIG. 3A is a block diagram illustrating an example of a lidar system according to some implementations. An environment 300 includes a lidar system 301 that includes a transmit (Tx) path and a receive (Rx) path, and one or more optics 310. The Tx path may include a laser source 302, a seed modulation device 350. The Tx path may include an amplifier (not shown) between the seed modulation device 350 and the one or more optics 310. The Rx path may include a mixer 308, a detector 312, and a transimpedance amplifier (TIA) 314. The laser source 302, the detector 312, and TIA 314 may have configuration similar to that of the laser source 202, the detector 212, and TIA 214, respectively.

The laser source 302 may be configured to provide the light signal to the seed modulation device 350, which is configured to modulate an amplitude, a phase and/or a frequency of the light signal based on one of radio frequency (RF) signals 321-1, 321-2, . . . , 321-N and using Continuous Wave (CW) modulation or quasi-CW modulation to generate corresponding modulated light signals 341-1, 341-2, . . . , 341-N, respectively. The seed modulation device 350 may be configured to temporally multiplex the modulated light signals to an amplifier (not shown). The amplifier may be configured to amplify the (multiplexed) modulated light signal to generate an amplified light signal to the optics 310.

In some implementations, the optics 310 may (1) receive a plurality of amplified light signals (e.g., N amplified light signals generated based on modulated light signals 341-1, 341-2, . . . , 341-N) via a plurality of different input channels (e.g., N different input channels), (2) transmit or steer the plurality of received amplified light signals into an environment via a plurality of different TX channels (e.g., N different TX channels), and (3) receive a plurality of returned signals reflected back from one or more objects via a plurality of different RX channels (e.g., N different RX channels) and provide the returned signals to the mixer 308. In some implementations, the mixer 308 may receive the returned signals via a plurality of different channels (e.g., N different channels). For example, the optics 310 may be configured to steer an amplified light signal that it receives from the Tx path via each input channel into an environment within a given field of view toward an object 318 via a corresponding TX channel, and then receive a returned signal reflected back from the object 318 via a corresponding RX channel, and provide the returned signal to the mixer 308 of the Rx path.

The seed modulation device 350 may be configured to modulate an amplitude, a phase and/or a frequency of the light signal based on an RF signal 325 and using Continuous Wave (CW) modulation or quasi-CW modulation to generate a modulated LO signal 345 and send the modulated LO signal to the mixer 308 of the Rx path.

Figure 3B:
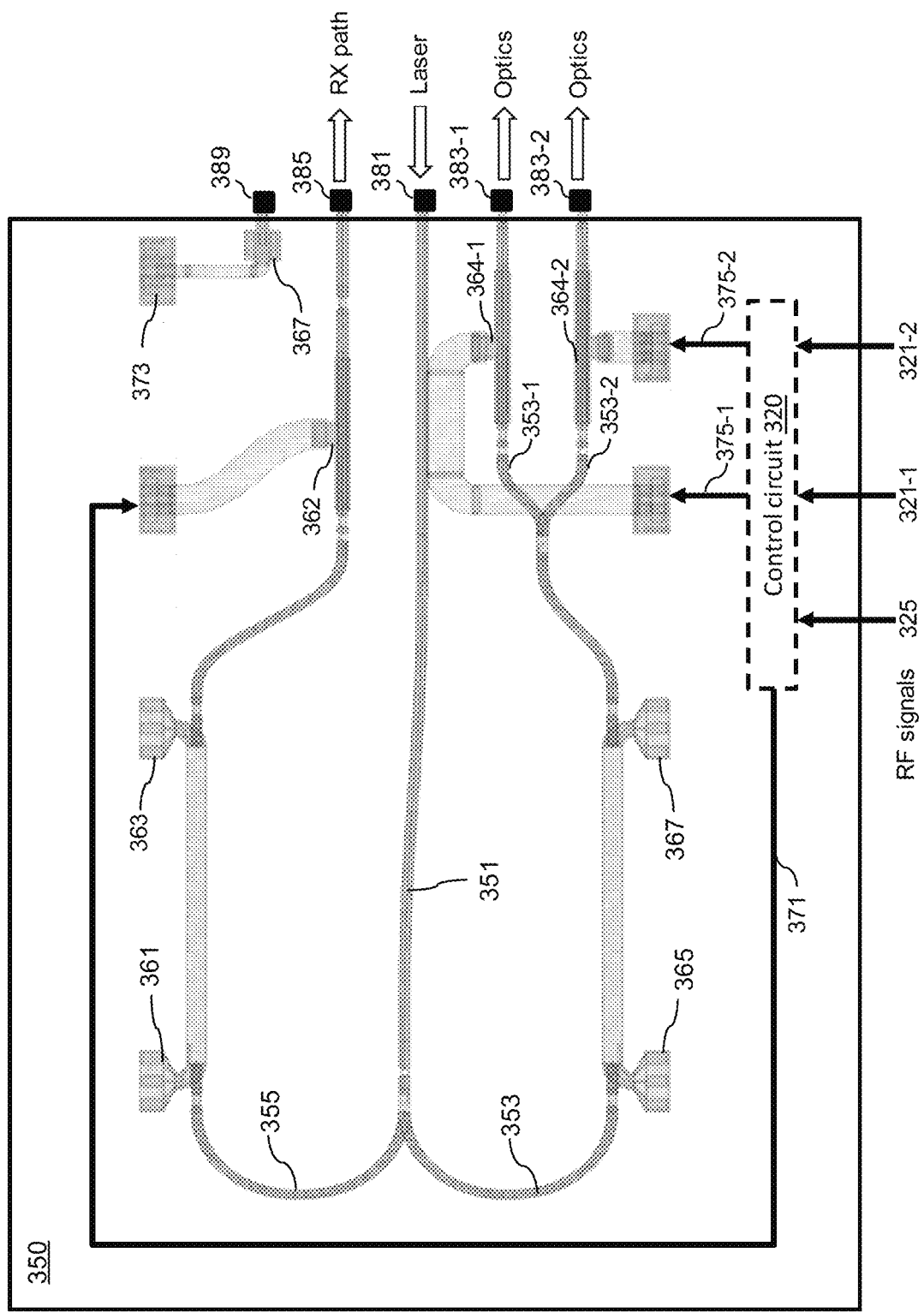
FIG. 3B is a block diagram illustrating an example of a seed modulation device according to some implementations.

In some implementations, the seed modulation device 350 may include a control circuit 320 configured to generate, based on an electric signal (e.g., RF signals 321-1, 321-2, . . . , 321-N), a control signal to turn on/off each of one or more first optical amplifiers (e.g., optical amplifier 362 in FIG. 3B) and a plurality of second optical amplifiers (e.g., optical amplifiers 364-1, 364-2 in FIG. 3B). In some implementations, the control circuit is not included in the seed modulation device 350 but included in the lidar sensor system 301. The control signal may indicate a time sequence for turning on/off each optical amplifier, thereby temporally multiplexing outputs of optical amplifiers. For example, the device may temporally multiplex output signals of the plurality of second optical amplifiers (e.g., output optical signals 341-1, 341-2, . . . , 341-N) according to a time sequence, and activate/deactivate output signals of the one or more first optical amplifiers (e.g., output optical signal 345) in synchronization with the time sequence of the plurality of second optical amplifiers. In some implementations, the control circuit 320 may be configured to change or vary, based on an electric signal, a driving current of each of the one or more first optical amplifiers and the plurality of second optical amplifiers to perform amplitude modulation (AM) or phase modulation PM of an input optical signal. In some implementations, the control circuit 320 may be configured to generate one or more control signals indicating (1) a time sequence for turning on/off each optical amplifier and/or (2) a driving current of each optical amplifier. More details of the seed modulation device 350 will be described in the following sections with reference to FIG. 3B and FIG. 3C.

In some implementations, the mixer 308 may be configured to mix (e.g., combine, multiply, etc.) the modulated LO signal with a returned signal received at a channel from the optics 310, to generate a down-converted signal and send the down-converted signal to the detector 312. In some arrangements, the mixer 308 may be configured to send the modulated LO signal to the detector 312.

In some implementations, the seed modulation device 350 may be configured to perform temporal multiplexing to send a first modulated light (optical) signal (e.g., modulated optical signal 341-1) and a second modulated light (optical) signal (e.g., modulated optical signal 341-1) to an amplifier (not shown in FIG. 3A). The amplifier may be configured to amplify the first and second modulated light signals to generate amplified light signals to the optics 310. The seed modulation device 350 may be configured to generate (1) a first modulated LO signal associated with the first modulated light signal in synchronization with generating the first modulated light signal (e.g., generating modulated LO signal 345 associated with the modulated optical signal 341-1 generated in synchronization with generating the modulated optical signal 341-1), and (2) a second modulated LO signal associated with the second modulated light signal in synchronization with generating the first modulated light signal (e.g., generating modulated LO signal 345 associated with the modulated optical signal 341-2 generated in synchronization with generating the modulated optical signal 341-2).

The optics 310 may be configured to steer the first and second modulated light signals (at different times) that it receives from the Tx path into an environment within a given field of view toward the object 318, may receive corresponding first and second returned signals reflected back from the object 318, and provide the first and second returned signals to the mixer 308 of the Rx path. The seed modulation device 350 may be configured to send the first and second modulated LO signals to the mixer 308 of the Rx path. The mixer 308 may be configured to pair (e.g., associate, link, identify, etc.) the first returned light signal and the first modulated LO signal, and mix (e.g., combine, multiply, etc.) the first returned light signal and the first modulated LO signal to generate a first down-converted signal and send the first down-converted signal to the detector 312. Similarly, the mixer 308 may be configured to pair the second returned light signal and the second modulated LO signal, and mix the second returned light signal and the second modulated LO signal to generate a second down-converted signal and send the second down-converted signal to the detector 312. The detector 312 may be configured to generate first and second electrical signals based on the first and second down-converted signal, respectively. The vehicle control system 120 may be configured to determine a distance to the object 318 and/or measure the velocity of the object 318 based on the first and second electrical signals, received via TIA 314.

FIG. 3B is a block diagram illustrating an example of a seed modulation device according to some implementations.

In some implementations, a seed modulation device 350 may include an input optical path 351, a first optical path 355 branched from the input optical path 351 at one end thereof (e.g., left end of the first optical path 355), and a second optical path 353 branched from the input optical path at one end thereof (e.g., left end of the second optical path 353). The input optical path 351 may be formed/disposed/positioned between the first optical path 355 and the second optical path 353. For example, as shown in FIG. 3B, the input optical path 351 may be formed in a middle portion of the device 350, while the first and second optical paths may be formed in upper and lower portions of the device 350, respectively. The seed modulation device 350 may receive a light beam (or optical signal) at the input optical path 351. The device 350 may receive an optical signal at the input optical path from a laser source (e.g., laser source 302 in FIG. 3A). The first optical path 355 may function as a local oscillator (LO) path and the second optical path 353 may function as a TX path. The device may include a plurality of TX paths (e.g., TX paths 353-1 and 353-2) branched from the second optical path 353 at one ends thereof (e.g., left ends of the TX paths 353-1 and 353-2).

In some implementations, the seed modulation device 350 may include an input port 381 coupled to the input optical path 351 and configured to receive the optical signal from the laser source. The device 350 may include an LO output port 385 coupled/connected to the other end of the first optical path 355 (e.g., right end of the first optical path 355), and a plurality of TX output ports (e.g., TX output ports 383-1, 383-2) coupled/connected to the other ends of the plurality of TX paths, respectively.

In some implementations, the seed modulation device 350 may include one or more first optical amplifiers (e.g., optical amplifier 362) coupled to the first optical path 355. The one or more first optical amplifiers may include a SOA (e.g., SOA 362). In some implementations, the device may include a plurality of first phase modulators (e.g., phase modulators 361, 363) coupled to the first optical path 355. The plurality of first phase modulators may include an electro-optic modulator or a liquid crystal modulator. The one or more first optical amplifiers (e.g., optical amplifier 362) may be formed/disposed/positioned between the plurality of first phase modulators (e.g., phase modulators 361, 363) and the LO output port (e.g., LO output port 385).

In some implementations, the seed modulation device 350 may include a plurality of second optical amplifiers (e.g., optical amplifiers 364-1, 364-2) respectively coupled to the plurality of TX paths (e.g., TX paths 353-1, 353-2). Each of the plurality of second optical amplifiers may be a SOA (e.g., SOAs 364-1, 364-2). The device may include a plurality of second phase modulators (e.g., phase modulators 365, 367) coupled to the second optical path 353. The plurality of second phase modulators may include an electro-optic modulator or a liquid crystal modulator. Each of the plurality of second optical amplifiers may be formed/disposed/positioned between the plurality of second phase modulators and a corresponding one of the TX output ports. For example, the optical amplifier 364-1 may be formed between the phase modulators 365, 367 and the TX output port 383-1.

In some implementations, the seed modulation device 350 may include a control circuit 320 configured to generate, based on an electric signal (e.g., RF signals 321-1, 321-2, 325), a control signal (e.g., control signals 375-1, 375-2, 371) to turn on/off each of the one or more first optical amplifiers and the plurality of second optical amplifiers. For example, the control circuit 320 may receive RF signals 321-1, 321-2, 325, and generate, based on the RF signals 321-1, 321-2, 325, control signals 375-1, 375-2, 371 to turn on/off the optical amplifiers 364-1, 364-2, 362, respectively. The control signal may indicate a time sequence for turning on/off each optical amplifier, thereby temporally multiplexing outputs of optical amplifiers. For example, the control circuit 320 may temporally multiplex output signals of the plurality of second optical amplifiers (e.g., optical amplifiers 364-1, 364-2) according to a time sequence, and turn on/off output signals of the one or more first optical amplifiers (e.g., optical amplifier 362) in synchronization with the time sequence of the plurality of second optical amplifiers. The control circuit 320 may turn on the first optical amplifiers (e.g., optical amplifier 362) in synchronization with turning on one of the plurality of TX paths (e.g., TX paths 353-1, 353-2) via the second optical amplifiers (e.g., optical amplifiers 364-1, 364-2). The control circuit 320 may turn on the first optical path (e.g., optical path 355) via the first optical amplifiers in synchronization with turning on any one of the plurality of TX paths (e.g., TX paths 353-1, 353-2) via the second optical amplifiers. For example, the control circuit 320 may turn on/off the first optical amplifier 362 at the same time as turning on/off one of the plurality of second optical amplifiers 364-1, 364-2. In other words, the control circuit 320 may control the plurality of second optical amplifiers (e.g., SOAs) to temporally multiplex TX channels by turning on/off the plurality of TX paths 353-1, 353-2.

In some implementations, the control circuit 320 may turn on/off each of the plurality of second optical amplifiers with a high degree of fidelity, for example with 20-25 dB suppression ratio. The control circuit may turn on/off each SOA (e.g., SOA 362, 364-1, 364-2) by biasing the SOA in forward or backward. For example, if all of the plurality of the SOAs are forward-biased, when the input optical path 351 receives a light beam of 20 milliwatt (mW), the light beam may be divided into two light beams of 10 mW for the first and second optical paths 355, 353, and further divided into a plurality of light beams (of 2 to 5 mW, for example) for the plurality of TX paths 353-1, 353-1, respectively. On the other hand, if none of the plurality of second SOAs are biased (either forward-biased or backward-biased), a light beam of 1 mW may flow through each of the plurality of TX paths 353-1, 353-2. If one of the SOA is forward-biased, then that SOA may output a light beam of 2 to 5 mW through the corresponding TX path, while outputting substantially no light beam if that SOA is backward-biased.

In some implementations, the seed modulation device 350 may perform amplitude modulation (AM) or phase modulation (PM) using one or more SOAs (e.g., SOAs 362, 364-1, 364-2). In some implementations, an electro-optic modulation effect may be implemented in InP SOAs using a different quantum well (QW) structure or using no QW (just an intrinsic PN junction of InP). For example, the device 350 may perform AM or PM of an input optical signal (e.g., input optical signal received from the input port 381) to generate modulated TX signals using a plurality of SOAs coupled to the plurality of second optical paths (e.g., TX paths 353-1, 353-2). Similarly, the device 350 may perform AM or PM of an input optical signal (e.g., input optical signal received from the input port 381) to generate modulated LO signals using one or more SOAs coupled to the first optical path (e.g., optical path 355). The device 350 may perform AM or PM of an input optical signal by changing or varying a driving current of each of the plurality of SOAs. The device 350 may perform AM and PM of an input optical signal at the same time by changing or varying an amplitude of a driving current of a SOA. In some implementations, the device 350 may change or vary a driving current of a SOA (e.g., current of control signal 371 of SOA 362) based on an electrical signal (e.g., RF signal 325) to change the effective length of an active region of the SOA, thereby performing PM of an input optical signal. The device 350 may perform AM or PM of an input optical signal (by changing a driving current of a SOA) intertwined with multiplexing of modulated optical signals (by turning on/off the SOA). In this manner, the device 350 can slowly modulate the input optical signal to stabilize the phase thereof (e.g., no phase drift), while performing modulation and multiplexing at the same time.

In some implementations, the control circuit 320 (which may or may not be included in the seed modulation device) may be configured to change or vary, based on an electric signal (e.g., RF signal 321-1, 321-2, 325), a driving current of each of the one or more first optical amplifiers and the plurality of second optical amplifiers (e.g., SOAs 364-1, 364-2, 362) to perform AM or PM of an input optical signal (e.g., input signal received at input port 381). The control circuit 320 may change or vary a driving current of each optical amplifier using the control signal which indicates (1) a time sequence for turning on/off each optical amplifier and/or (2) a driving current of each optical amplifier.

In FIG. 3B, the seed modulation device 350 may include a photodiode 367, an electrical pad 373, and an optical input port 389 for a photodiode monitor.

Figure 3C:
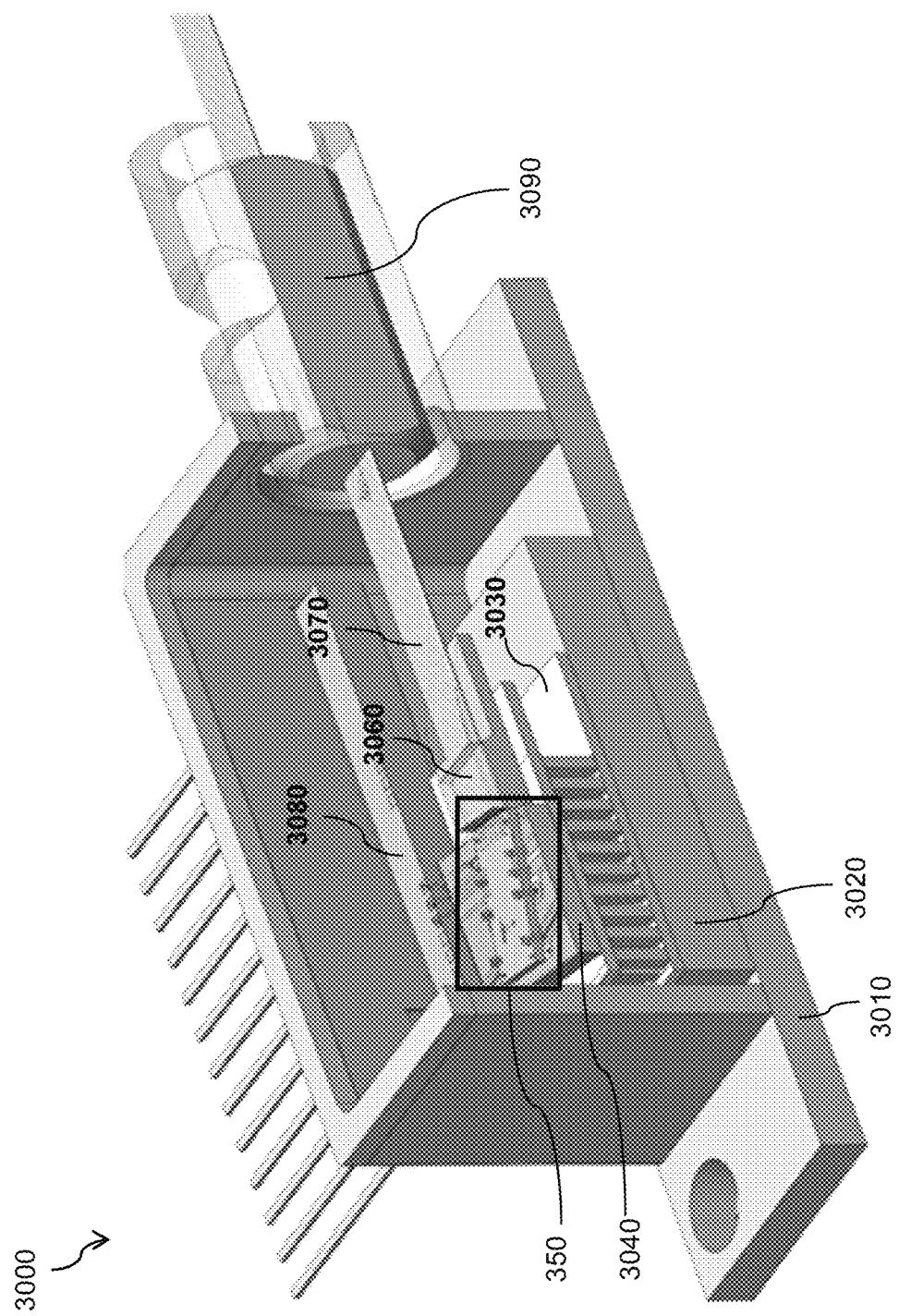
FIG. 3C is a block diagram illustrating an example of a seed modulation assembly according to some implementations.

FIG. 3C is a block diagram illustrating an example of a seed modulation assembly 3000 according to some implementations. The seed modulation assembly may include a housing 3010, a heat sink 3020, a cooler 3030, a seed modulation device/module/chip 350, a chip carrier 3040 housing the seed modulation device 350, a fiber array 3060, fiber cables 3070, an electric feedthrough 3080 and/or a fiber feedthrough 3090. The housing may be made of a nickel-cobalt ferrous alloy (e.g., Kovar). The heat sink 3020 may be made of CuW (Tungsten-Copper). The cooler 3040 may be thermo-electric cooler (TEC). The chip carrier 3040 may be made of ceramic or plastic. The fiber array 3060 may be a fiber array unit (FAU). The electric feedthrough 3080 may be configured to provide electric signals (e.g., RF signals) to the seed modulation device 350. The fiber feedthrough 3090 may be configured to provide optical signals (e.g., light beams from a laser source) to the seed modulation device 350.

In some implementations, the seed modulation device 350 may include all of its components (e.g., optical paths 351, 353, 355, optical amplifiers 362, 364-1, 364-2, phase modulators 361, 363, 365, 367, etc.) formed or disposed on a single substrate. The seed modulation device 350 may be a III-V semiconductor-based integrated photonic device in which all of its components are made of III-V materials and formed/disposed on a single substrate made of III-V materials. The III-V materials may include at least one of indium phosphide (InP), indium monoarsenide (InAs), or gallium and arsenide (GaAs).

In some implementations, the seed modulation device 350 may include at least one of silicon photonics circuitry, photonic lightwave circuit (PLC), or III-V semiconductor circuitry in which all of its components (e.g., optical paths 351, 353, 355, optical amplifiers 362, 364-1, 364-2, phase modulators 361, 363, 365, 367, etc.) are formed or disposed on a single substrate. In some implementations, all of the components of the device may be formed in a single layer to form a horizontal structure of an integrated circuit. In some implementations, components of the device may be formed or disposed over multiple layers stacked on a single substrate to form a vertical structure of an integrated circuit. For example, the device 350 may include phase modulators (e.g., phase modulators 361, 363, 365, 367) implemented as one or more PLC modules, optical paths (e.g., optical paths 351, 353, 355) implemented as silicon photonics circuitry, and SOAs (e.g., 362, 364-1, 364-2) implemented as III-V modules, all of which are disposed/formed on a single substrate.

FIG. 4 is a block diagram illustrating another example of a lidar system according to some implementations.

An environment 400 includes a lidar system 401 that includes a transmit (Tx) path and a receive (Rx) path, and one or more optics 410. The Tx path may include a laser source 402, a seed modulation device 450. The Tx path may include an amplifier (not shown) between the seed modulation device 450 and the one or more optics 410. The Rx path may include a mixer 408, a detector 412, and a transimpedance amplifier (TIA) 414. The laser source 402, the detector 412, and TIA 414 may have configuration similar to that of the laser source 302, the detector 312, and TIA 314, respectively, as shown in FIG. 3A.

The laser source 402 may be configured to provide the light signal to the seed modulation device 450, which is configured to modulate an amplitude, a phase and/or a frequency of the light signal based on one of radio frequency (RF) signals 421-1, 421-2, . . . , 421-N and using Continuous Wave (CW) modulation or quasi-CW modulation to generate corresponding modulated light signals 441-1, 441-2, . . . , 441-N, respectively. The seed modulation device 450 may be configured to temporally multiplex the modulated light signals to an amplifier (not shown). The amplifier may be configured to amplify the (multiplexed) modulated light signal to generate an amplified light signal to the optics 410.

In some implementations, the optics 410 may (1) receive a plurality of amplified light signals (e.g., N amplified light signals generated based on modulated light signals 441-1, 441-2, . . . , 441-N) via a plurality of different input channels (e.g., N different input channels), (2) transmit or steer the plurality of received amplified light signals into an environment via a plurality of different TX channels (e.g., N different TX channels), and (3) receive a plurality of returned signals reflected back from one or more objects via a plurality of different RX channels (e.g., N different RX channels) and provide the returned signals to the mixer 408. In some implementations, the mixer 408 may receive the returned signals via a plurality of different channels (e.g., N different channels). For example, the optics 410 may be configured to steer an amplified light signal that it receives from the Tx path via each input channel into an environment within a given field of view toward an object 418 via a corresponding TX channel, and then receive a returned signal reflected back from the object 418 via a corresponding RX channel, and provide the returned signal to the mixer 408 of the Rx path.

In some implementations, the seed modulation device 450 may be configured to modulate an amplitude, a phase and/or a frequency of the light signal based on one of radio frequency (RF) signals 425-1, 425-2, . . . , 425-N and using Continuous Wave (CW) modulation or quasi-CW modulation to generate corresponding modulated LO signals 445-1, 445-2, . . . , 445-N, respectively. The seed modulation device 450 may be configured to temporally multiplex the modulated LO signals to the mixer 408 of the Rx path. In some implementations, the mixer 408 may receive a plurality of modulated LO signals (e.g., N modulated LO signals 445-1, 445-2, . . . , 445-N) via a plurality of different LO channels (e.g., N different LO channels).

In some implementations, the seed modulation device 450 may include a plurality of TX paths branched from the second optical path (e.g., optical path 353 in FIG. 3B) at one ends thereof. The device 450 may include a plurality of second optical amplifiers respectively coupled to the plurality of TX paths. Each of the plurality of second optical amplifiers may be a SOA. The device may temporally multiplex output signals of the plurality of second optical amplifiers according to a time sequence. In other words, the device 450 may control the plurality of second optical amplifiers (e.g., SOAs) to temporally multiplex TX channels by turning on/off the plurality of TX paths.

Similarly, the seed modulation device 450 may include a plurality of LO paths branched from the first optical path (e.g., optical path 355 in FIG. 3B) at one ends thereof. The device may include a plurality of third optical amplifiers respectively coupled to the plurality of LO paths. Each of the plurality of third optical amplifiers may be a SOA. The device may temporally multiplex output signals of the plurality of third optical amplifiers according to a time sequence. In other words, the device 450 may control the plurality of third optical amplifiers (e.g., SOAs) to temporally multiplex LO channels by turning on/off the plurality of LO paths. In some implementations, there may be one-to-one correspondence between (1) the plurality of LO paths (and the plurality of third optical amplifiers coupled thereto) and (2) the plurality of TX paths (and the plurality of second optical amplifiers coupled thereto).

In some implementations, the seed modulation device 450 may include a control circuit 420 configured to generate, based on an electric signal (e.g., RF signals 421-1, 421-2, . . . , 421-N), a control signal to turn on/off each of the plurality of second optical amplifiers. In some implementations, the control circuit is not included in the seed modulation device 450 but included in the lidar sensor system 401. The control signal may indicate a time sequence for turning on/off each of the second optical amplifiers, thereby temporally multiplexing outputs of optical amplifiers. For example, the device may temporally multiplex output signals of the plurality of second optical amplifiers according to a time sequence, and activate/deactivate corresponding output signals of the plurality of third optical amplifiers (e.g., output optical signals 445-1, 445-2, . . . , 445-N) in synchronization with the time sequence of the plurality of second optical amplifiers.

In some implementations, the control circuit 420 may be configured to change or vary, based on an electric signal, a driving current of each of the plurality of third optical amplifiers and the plurality of second optical amplifiers to perform amplitude modulation (AM) or phase modulation PM of an input optical signal. The control circuit 420 may be configured to generate one or more control signals indicating (1) a time sequence for turning on/off each optical amplifier and/or (2) a driving current of each optical amplifier.

In some implementations, the mixer 408 may be configured to mix (e.g., combine, multiply, etc.) a modulated LO signal received at a particular LO channel, with a returned signal received from the optics 410 at a RX channel corresponding to the particular LO channel, to generate a down-converted signal and send the down-converted signal to the detector 412. In some arrangements, the mixer 408 may be configured to send the modulated LO signal to the detector 412.

In some implementations, the seed modulation device 450 may be configured to perform temporal multiplexing to send a first modulated light (optical) signal (e.g., modulated optical signal 441-1) and a second modulated light (optical) signal (e.g., modulated optical signal 441-1) to an amplifier (not shown in FIG. 4). The amplifier may be configured to amplify the first and second modulated light signals to generate amplified light signals to the optics 410 via respective TX channels. The seed modulation device 450 may be configured to generate (1) a first modulated LO signal associated with the first modulated light signal in synchronization with generating the first modulated light signal (e.g., generating modulated LO signal 445-1 associated with the modulated optical signal 441-1 generated in synchronization with generating the modulated optical signal 441-1), and (2) a second modulated LO signal associated with the second modulated light signal in synchronization with generating the first modulated light signal (e.g., generating modulated LO signal 445-2 associated with the modulated optical signal 441-2 generated in synchronization with generating the modulated optical signal 441-2).

The optics 410 may be configured to steer the first and second modulated light signals (at different times) that it receives from the Tx path into an environment within a given field of view toward the object 418, may receive corresponding first and second returned signals reflected back from the object 418, and provide the first and second returned signals to the mixer 408 of the Rx path. The seed modulation device 450 may be configured to send the first and second modulated LO signals via respective LO channels to the mixer 408 of the Rx path. The mixer 408 may be configured to pair (e.g., associate, link, identify, etc.) the first returned light signal and the first modulated LO signal, and mix (e.g., combine, multiply, etc.) the first returned light signal and the first modulated LO signal to generate a first down-converted signal and send the first down-converted signal to the detector 412. Similarly, the mixer 408 may be configured to pair the second returned light signal and the second modulated LO signal, and mix the second returned light signal and the second modulated LO signal to generate a second down-converted signal and send the second down-converted signal to the detector 412. The detector 412 may be configured to generate first and second electrical signals based on the first and second down-converted signal, respectively. The vehicle control system 120 may be configured to determine a distance to the object 418 and/or measures the velocity of the object 418 based on the first and second electrical signals, received via TIA 414.

Figure 5:
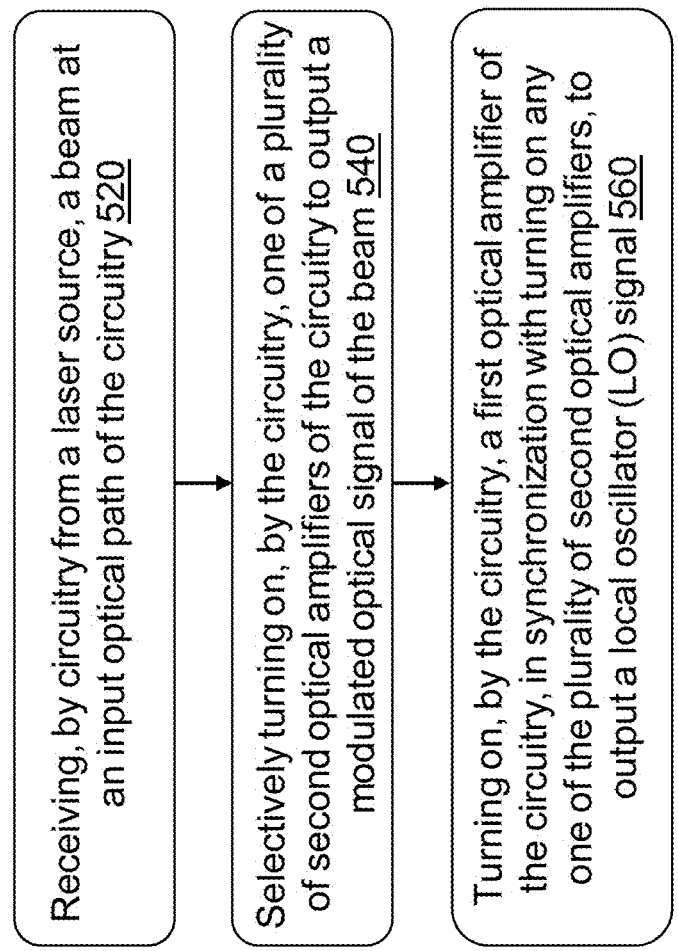
FIG. 5 is a flowchart illustrating an example methodology for generating modulated optical signals using a seed modulation device, according to some implementations.

FIG. 5 is a flowchart illustrating an example methodology for generating modulated optical signals using a seed modulation device (e.g., seed modulation device 350 in FIG. 3A, FIG. 3B, FIG. 3C, or seed modulation device 350 in FIG. 4), according to some implementations. In some implementations, the seed modulation device may be circuitry including an input optical path (e.g., input optical path 351 in FIG. 3B), a first optical path (e.g., optical path 355 in FIG. 3B) and a plurality of second optical paths (e.g., TX paths 353-1, 353-2 in FIG. 3B), respectively branched from the input optical path, a first optical amplifier (e.g., optical amplifier 362 in FIG. 3B) coupled to the first optical path, and a plurality of second optical amplifiers (e.g., optical amplifiers 364-1, 364-2 in FIG. 3B) respectively coupled to the plurality of second optical paths (e.g., TX paths 353-1, 353-2 in FIG. 3B). In some implementations, the seed modulation device may include at least one of silicon photonics circuitry, photonic lightwave circuit (PLC), or III-V semiconductor circuitry. The device may be III-V semiconductor circuitry. For example, referring to FIG. 3B and FIG. 3C, the device 350 may include phase modulators (e.g., phase modulators 361, 363, 365, 367) implemented as one or more PLC modules, optical paths (e.g., optical paths 351, 353, 355) implemented as silicon photonics circuitry, and SOAs (e.g., 362, 364-1, 364-2) implemented as III-V modules, all of which are disposed/formed on a single substrate.

In some implementations, the first optical amplifier and the plurality of second optical amplifiers (e.g., optical amplifiers 362, 364-1, 364-2 in FIG. 3B) may include one or more semiconductor optical amplifiers (SOAs). In some implementations, the device may further include one or more phase modulators (e.g., phase modulators 365, 367 in FIG. 3B) coupled to the second optical path (e.g., optical path 353 in FIG. 3B). The device may further include one or more phase modulators (e.g., phase modulators 361, 363 in FIG. 3B) coupled to the first optical path (e.g., optical path 355 in FIG. 3B). The number of the one or more phase modulators coupled to the first optical path (e.g., two phase modulators on the optical path 355 in FIG. 3B) may be the same as the number of one or more phase modulators coupled to the second optical path (e.g., two phase modulators on the optical path 353 in FIG. 3B). In some implementations, the device may further include a first output port (e.g., output port 385 in FIG. 3B) coupled to an end of the first optical path (e.g., optical path 355 in FIG. 3B), and a plurality of second output ports (e.g., output ports 383-1, 383-2 in FIG. 3B) coupled to respective ends of the plurality of second optical paths (e.g., optical paths 353-1, 353-2 in FIG. 3B).

Referring back to FIG. 5, in this example methodology, a process 500 begins at step 520 by receiving, by circuitry (e.g., circuitry implementing the seed modulation device 350) from a laser source (e.g., laser source 202, 302, 402), a beam at the input optical path of the circuitry (e.g., input optical path 351).

At step 540, in some implementations, the circuitry (e.g., control circuit 320) may selectively turn on one of the plurality of second optical amplifiers (e.g., optical amplifiers 364-1 in FIG. 3B) to output a modulated optical signal of the beam (e.g., modulated optical signal 341-1 in FIG. 3A). The circuitry may be configured to output the modulated optical signal of the beam to a corresponding one of the plurality of second output ports (e.g., output port 383-1 in FIG. 3B).

In some implementations, the plurality of second optical amplifiers may include a plurality of semiconductor optical amplifiers (SOAs). The control circuit may be configured to turn on or off the plurality of SOAs to temporally multiplex output signals of the plurality of SOAs. The circuitry may be configured to change a driving current of one of the plurality of SOAs to perform at least one of amplitude modulation (AM) or phase modulation (PM) of the beam. For example, the circuitry may be configured to perform at least one of AM or PM of the beam by generating one or more control signals (e.g., control signals 371, 375-1, 375-2 in FIG. 3B) indicating (1) a time sequence for turning on/off each optical amplifier and/or (2) a driving current of each optical amplifier.

At step 560, in some implementations, the circuitry (e.g., control circuit 320) may turn on the first optical amplifier (e.g., optical amplifier 362), in synchronization with turning on any one of the plurality of second optical amplifiers (e.g., optical amplifiers 364-1, 364-2), to output a local oscillator (LO) signal (e.g., LO signal 345 in FIG. 3A). The circuitry may be configured to output the LO signal to the first output port (e.g., output port 385 in FIG. 3B).

In some implementations, the first optical amplifier (e.g., optical amplifier 362) may be a first SOA. The circuitry may be configured to turn on or off the first SOA to output the LO signal according to a time sequence. The circuitry may be configured to change a driving current of the first SOA to perform at least one of AM or PM of the beam.

In some implementations, the first optical amplifier may include a plurality of third optical amplifiers. The circuitry (e.g., control circuit 420 in FIG. 4) may be configured to selectively turn on one of the plurality of third optical amplifiers to output a corresponding LO optical signal (e.g., LO optical signal 445-1, 445-2, . . . , 445-N).

Figure 6:
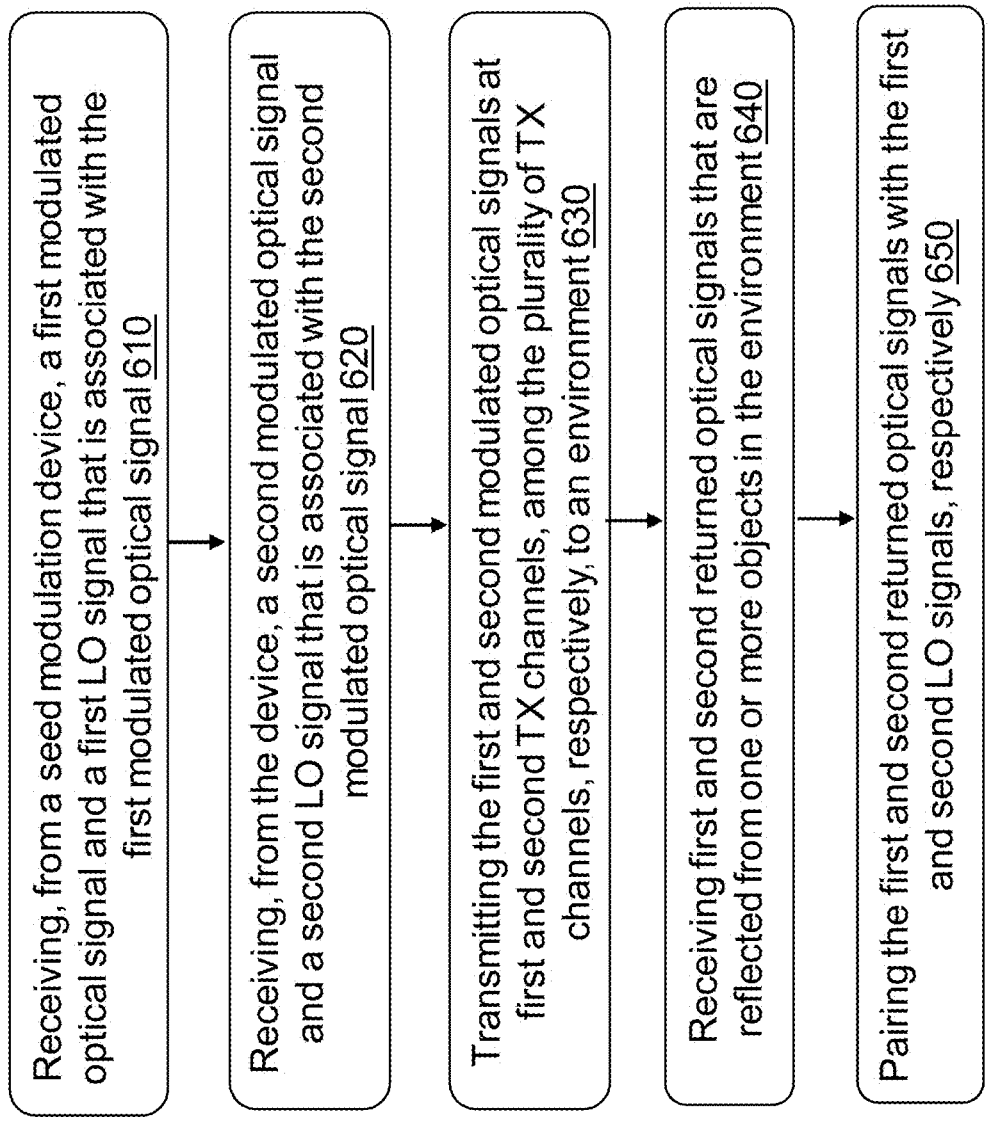
FIG. 6 is a flowchart illustrating an example methodology for controlling a lidar system using a seed modulation device, according to some implementations.

FIG. 6 is a flowchart illustrating an example methodology for controlling a lidar system using a seed modulation device (e.g., device 350 in FIG. 3A to FIG. 3C, device 450 in FIG. 4), according to some implementations. In some implementations, a lidar system (e.g., lidar sensor system 301 in FIG. 3A, lidar sensor system 401 in FIG. 4) may include the seed modulation device, a laser source (e.g., laser 302 in FIG. 3A, laser 402 in FIG. 4) configured to generate a beam, a plurality of transmit (TX) channels (e.g., TX channels 341-1, . . . , 341-N in FIG. 3A, or TX channels 441-1, . . . , 441-N in FIG. 4), and one or more optical components (e.g., optics 310 in FIG. 3A, optics 410 in FIG. 4).

In this example methodology, a process 600 begins at step 610 by receiving, by one or more optical components (e.g., optics 310) from the seed modulation device (e.g., device 350), a first modulated optical signal and a first LO signal that is associated with the first modulated optical signal. At step 620, in some implementations, the one or more optical components (e.g., optics 310) may be configured to receive, from the device (e.g., device 350), a second modulated optical signal and a second LO signal that is associated with the second modulated optical signal.

For example, referring to FIG. 3A, the seed modulation device 350 may be configured to perform temporal multiplexing to send a first modulated light (optical) signal (e.g., modulated optical signal 341-1) and a second modulated light (optical) signal (e.g., modulated optical signal 341-1) to an amplifier (not shown in FIG. 3A). The amplifier may be configured to amplify the first and second modulated light signals to generate amplified light signals to the optics 310. The seed modulation device 350 may be configured to generate (1) a first modulated LO signal associated with the first modulated light signal in synchronization with generating the first modulated light signal (e.g., generating modulated LO signal 345 associated with the modulated optical signal 341-1 generated in synchronization with generating the modulated optical signal 341-1), and (2) a second modulated LO signal associated with the second modulated light signal in synchronization with generating the first modulated light signal (e.g., generating modulated LO signal 345 associated with the modulated optical signal 341-2 generated in synchronization with generating the modulated optical signal 341-2).

At step 630, in some implementations, the one or more optical components may be configured to transmit the first and second modulated optical signals at first and second TX channels, among the plurality of TX channels, respectively, to an environment. For example, referring to FIG. 3A, the optics 310 may be configured to steer the first and second modulated light signals (at different times) that it receives from the Tx path into an environment within a given field of view toward the object 318, At step 640, in some implementations, the one or more optical components may be configured to receive first and second returned optical signals that are reflected from one or more objects in the environment. For example, referring to FIG. 3A, the optics 310 may be configured to receive corresponding first and second returned signals reflected back from the object 318, and provide the first and second returned signals to the mixer 308 of the Rx path.

At step 650, in some implementations, the one or more optical components may be configured to pair the first and second returned optical signals with the first and second LO signals, respectively. For example, referring to FIG. 3A, the seed modulation device 350 may be configured to send the first and second modulated LO signals to the mixer 308 of the Rx path. The mixer 308 may be configured to pair (e.g., associate, link, identify, etc.) the first returned light signal and the first modulated LO signal, and mix (e.g., combine, multiply, etc.) the first returned light signal and the first modulated LO signal to generate a first down-converted signal and send the first down-converted signal to the detector 312. Similarly, the mixer 308 may be configured to pair the second returned light signal and the second modulated LO signal, and mix the second returned light signal and the second modulated LO signal to generate a second down-converted signal and send the second down-converted signal to the detector 312. The detector 312 may be configured to generate first and second electrical signals based on the first and second down-converted signal, respectively. The vehicle control system 120 may be configured to determine a distance to the object 318 and/or measures the velocity of the object 318 based on the first and second electrical signals, received via TIA 314.

Figure 7:
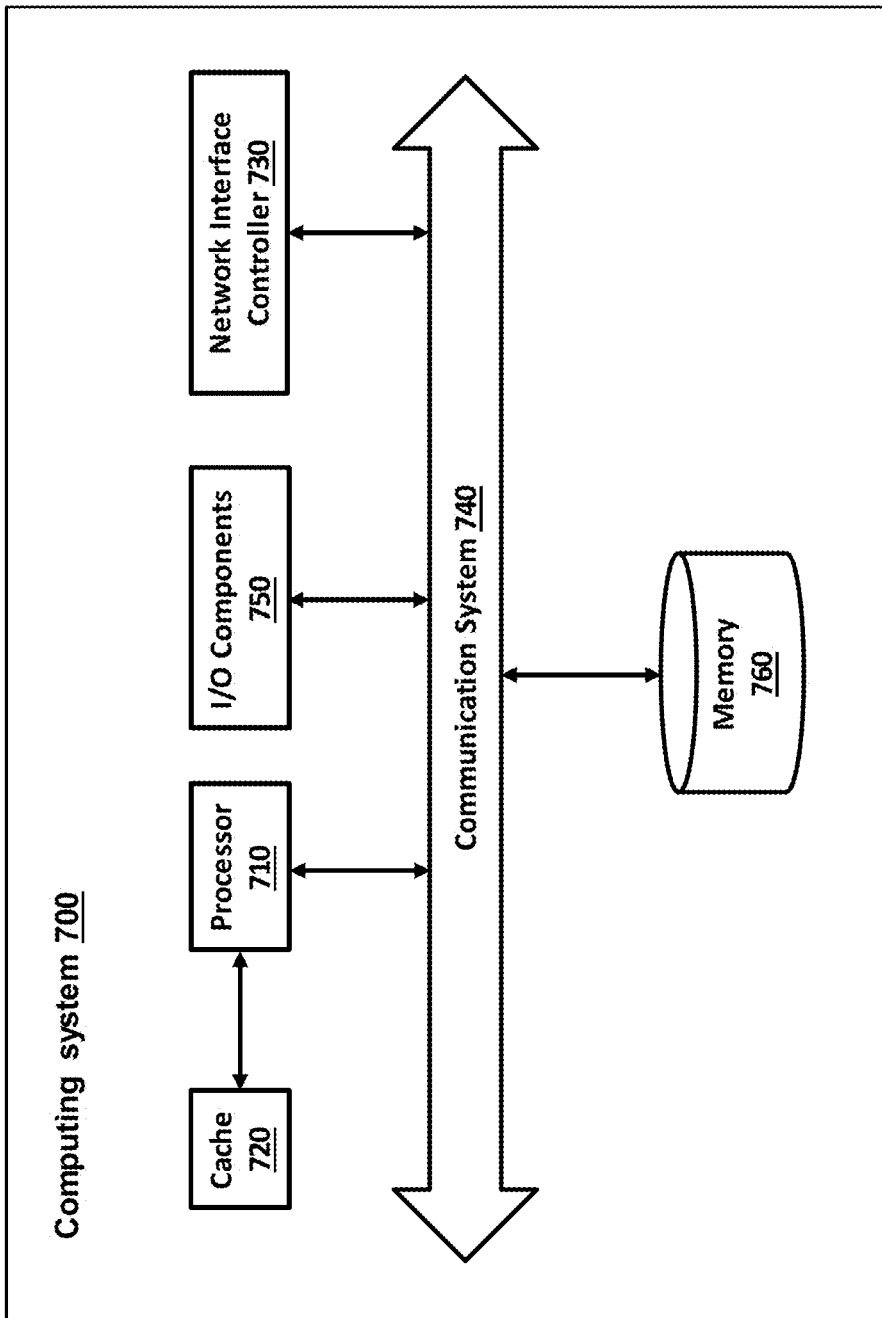
FIG. 7 is a block diagram illustrating an example of a computing system according to some implementations.

FIG. 7 is a block diagram illustrating an example of a computing system according to some implementations.

Referring to FIG. 7, the illustrated example computing system 700 includes one or more processors 710 in communication, via a communication system 740 (e.g., bus), with memory 760, at least one network interface controller 730 with network interface port for connection to a network (not shown), and other components, e.g., an input/output ("I/O") components interface 750 connecting to a display (not illustrated) and an input device (not illustrated). Generally, the processor(s) 710 will execute instructions (or computer programs) received from memory. The processor(s) 710 illustrated incorporate, or are directly connected to, cache memory 720. In some instances, instructions are read from memory 760 into the cache memory 720 and executed by the processor(s) 710 from the cache memory 720.

In more detail, the processor(s) 710 may be any logic circuitry that processes instructions, e.g., instructions fetched from the memory 760 or cache 720. In some implementations, the processor(s) 710 are microprocessor units or special purpose processors. The computing device 700 may be based on any processor, or set of processors, capable of operating as described herein. The processor(s) 710 may be single core or multi-core processor(s). The processor(s) 710 may be multiple distinct processors.

The memory 760 may be any device suitable for storing computer readable data. The memory 760 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, or Blu-Ray® discs). A computing system 700 may have any number of memory devices as the memory 760.

The cache memory 720 is generally a form of computer memory placed in close proximity to the processor(s) 710 for fast read times. In some implementations, the cache memory 720 is part of, or on the same chip as, the processor(s) 710. In some implementations, there are multiple levels of cache 720, e.g., L2 and L3 cache layers.

The network interface controller 730 manages data exchanges via the network interface (sometimes referred to as network interface ports). The network interface controller 730 handles the physical and data link layers of the OSI model for network communication. In some implementations, some of the network interface controller's tasks are handled by one or more of the processor(s) 710. In some implementations, the network interface controller 730 is part of a processor 710. In some implementations, a computing system 700 has multiple network interfaces controlled by a single controller 730. In some implementations, a computing system 700 has multiple network interface controllers 730. In some implementations, each network interface is a connection point for a physical network link (e.g., a cat-5 Ethernet link). In some implementations, the network interface controller 730 supports wireless network connections and an interface port is a wireless (e.g., radio) receiver/transmitter (e.g., for any of the IEEE 802.11 protocols, near field communication "NFC", Bluetooth, ANT, or any other wireless protocol). In some implementations, the network interface controller 730 implements one or more network protocols such as Ethernet. Generally, a computing device 700 exchanges data with other computing devices via physical or wireless links through a network interface. The network interface may link directly to another device or to another device via an intermediary device, e.g., a network device such as a hub, a bridge, a switch, or a router, connecting the computing device 700 to a data network such as the Internet.

The computing system 700 may include, or provide interfaces for, one or more input or output ("I/O") devices. Input devices include, without limitation, keyboards, microphones, touch screens, foot pedals, sensors, MIDI devices, and pointing devices such as a mouse or trackball. Output devices include, without limitation, video displays, speakers, refreshable Braille terminal, lights, MIDI devices, and 2-D or 3-D printers.

Other components may include an I/O interface, external serial device ports, and any additional co-processors. For example, a computing system 700 may include an interface (e.g., a universal serial bus (USB) interface) for connecting input devices, output devices, or additional memory devices (e.g., portable flash drive or external media drive). In some implementations, a computing device 700 includes an additional device such as a co-processor, e.g., a math co-processor can assist the processor 710 with high precision or complex calculations.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of blocks in the processes disclosed is an example of illustrative approaches. Based upon design preferences, it is understood that the specific order or hierarchy of blocks in the processes may be rearranged while remaining within the scope of the previous description. The accompanying method claims present elements of the various blocks in a sample order, and are not meant to be limited to the specific order or hierarchy presented.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the blocks of various examples must be performed in the order presented. As will be appreciated by one of skill in the art the order of blocks in the foregoing examples may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the examples disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The blocks of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present disclosure. Various modifications to these examples will be readily apparent to those skilled in the art, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

What is claimed is:

1. An optical device in a light detection and ranging (lidar) sensor for a vehicle, comprising:
an input optical path configured to receive a beam from a laser source;
a first optical path and a plurality of second optical paths, respectively branched from the input optical path;
a first optical amplifier coupled to the first optical path;
a plurality of second optical amplifiers respectively coupled to the plurality of second optical paths; and
a control circuit configured to:
selectively turn on one of the plurality of second optical amplifiers to modulate the beam received through the second optical path and output a modulated optical signal of the beam, and turn on the first optical amplifier, in synchronization with turning on any one of the plurality of second optical amplifiers, to output a local oscillator (LO) signal.

2. The optical device of claim 1, wherein the plurality of second optical amplifiers include one or more semiconductor optical amplifiers (SOAs).

3. The optical device of claim 2, wherein the control circuit is configured to turn on or off one of the one or more SOAs to perform amplitude modulation of the beam.

4. The optical device of claim 2, wherein the control circuit is configured to change a driving current of one of the one or more SOAs to perform phase modulation of the beam.

5. The optical device of claim 1, wherein the device includes at least one of silicon photonics circuitry, photonic lightwave circuit (PLC), or III-V semiconductor circuitry.

6. The optical device of claim 1, wherein
the device is III-V semiconductor circuitry, and
the III-V semiconductor circuitry includes at least one of indium phosphide (InP), indium monoarsenide (InAs), or gallium and arsenide (GaAs).

7. The optical device of claim 1, wherein
the first optical amplifier includes a plurality of third optical amplifiers,
wherein the control circuit is configured to selectively turn on one of the plurality of third optical amplifiers to output a corresponding LO optical signal.

8. The optical device of claim 1, wherein the first optical amplifier is a first semiconductor optical amplifier (SOA).

9. The optical device of claim 8, wherein the control circuit is configured to turn on or off the first SOA to perform amplitude modulation of the beam.

10. The optical device of claim 8, wherein the control circuit is configured to change a driving current of the first SOA to perform phase modulation of the beam.

11. The optical device of claim 1, further comprising one or more phase modulators coupled to the first optical path or the second optical path,
wherein the one or more phase modulators are configured to perform phase modulation of the beam.

12. The optical device of claim 11, wherein
the control circuit is configured to generate one or more control signals to turn on or off the first optical amplifier and the plurality of second optical amplifiers, and
the one or more control signals indicate a time sequence for turning on or off the plurality of second optical amplifiers.

13. The optical device of claim 12, wherein the control circuit is configured to turn on or off output signals of the first optical amplifier in synchronization with the time sequence for turning on or off the plurality of second optical amplifiers.

14. The optical device of claim 12, wherein the control circuit is configured to temporarily multiplex output signals of the plurality of second optical amplifiers according to the time sequence.

15. The optical device of claim 12, wherein the control circuit is configured to temporarily multiplex the plurality of second optical paths according to the time sequence.

16. A light detection and ranging (lidar) system comprising:
a laser source configured to generate a beam;
the device according to claim 1;
a plurality of transmit (TX) channels; and
one or more optical components configured to:
receive, from the device, a first modulated optical signal and a first LO signal that is associated with the first modulated optical signal,
receive, from the device, a second modulated optical signal and a second LO signal that is associated with the second modulated optical signal,
transmit the first and second modulated optical signals at first and second TX channels, among the plurality of TX channels, respectively, to an environment,
receive first and second returned optical signals that are reflected from one or more objects in the environment, and
pair the first and second returned optical signals with the first and second LO signals, respectively.

17. A method of generating modulated optical signals in circuitry, the circuitry comprising: an input optical path; a first optical path and a plurality of second optical paths, respectively branched from the input optical path; a first optical amplifier coupled to the first optical path; a plurality of second optical amplifiers respectively coupled to the plurality of second optical paths, the method comprising:
receiving, by the circuitry from a laser source, a beam at the input optical path;
selectively turning on, by the circuitry, one of the plurality of second optical amplifiers to modulate the beam received through the second optical path and output a modulated optical signal of the beam, and
turning on, by the circuitry, the first optical amplifier, in synchronization with turning on any one of the plurality of second optical amplifiers, to output a local oscillator (LO) signal.

18. The method of claim 17, wherein the first optical amplifier and the plurality of second optical amplifiers include one or more semiconductor optical amplifiers (SOAs).

19. The method of claim 18, further comprising:
turning on or off one of the one or more SOAs to perform amplitude modulation of the beam.

20. The method of claim 18, further comprising:
changing a driving current of one of the one or more SOAs to perform phase modulation of the beam.

* * * * *